(12) United States Patent  (10) Patent No.: US 9,421,900 B2
Schmeichel et al.  (45) Date of Patent: *Aug. 23, 2016

(54) ROLL-UP TARP CONVERSION KIT AND METHODS OF USE

(71) Applicant: Agri-Cover, Inc., Jamestown, ND (US)

(72) Inventors: Charles M. Schmeichel, Jamestown, ND (US); Shawn J. Wock, Buchanan, ND (US)

(73) Assignee: Agri-Cover, Inc., Jamestown, ND (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/617,345

(22) Filed: Feb. 9, 2015

(65) Prior Publication Data

US 2015/0151663 A1 Jun. 4, 2015

Related U.S. Application Data

(63) Continuation of application No. 13/901,102, filed on May 23, 2013, now Pat. No. 8,985,669.

(60) Provisional application No. 61/651,309, filed on May 24, 2012.

(51) Int. Cl.
   *B60P 7/04* (2006.01)
   *B60J 7/08* (2006.01)
   *B23P 6/00* (2006.01)

(52) U.S. Cl.
   CPC ... *B60P 7/04* (2013.01); *B23P 6/00* (2013.01); *B60J 7/085* (2013.01); *Y10T 29/49716* (2015.01)

(58) Field of Classification Search
   CPC .............. B60J 7/068; B60J 7/085; B60J 11/02
   USPC ........................................................ 296/98
   See application file for complete search history.

(56) References Cited

U.S. PATENT DOCUMENTS 102,642 A 5/1870 Yenne
856,159 A 6/1907 Keller
(Continued)

FOREIGN PATENT DOCUMENTS

CA 1 243 062 A1 10/1988
DE 33 40 876 A1 5/1985
(Continued)

OTHER PUBLICATIONS

Agri-Cover, Inc., ACI™ Agri-Cover, Inc 2008 Roll Tarp Price Guide AGRI-COVER® SRT-2™ Spool Roll Tarp AGRI-COVER® EZ-LOC® Roll-Up Tarp, Price Guide, 2008, 23pgs, ACI, Jamestown, North Dakota.

(Continued)

*Primary Examiner* — Dennis H Pedder
(74) *Attorney, Agent, or Firm* — Moore & Hansen, PLLC; Robert C. Freed

(57) ABSTRACT

A motorized conversion kit for converting manually operated roll tarps includes front and rear arm assemblies and a roll tube extension. The front arm assembly includes a drive assembly that drives an output shaft. The output shaft is removably connectable to the roll tube extension that is connected to a modified roll tube. The connection between the output shaft and the roll tube extension has two distinct modes. The output shaft can be removably connected to the roll tube extension with a clevis pin such that the output shaft and the roll tube extension rotate together or the output shaft can be retained within the roll tube extension by a roll pin residing in a peripheral grove in the output shaft so that the output shaft may rotate independently of the roll tube extension. Methods of installing and using the conversion kit are also disclosed.

20 Claims, 12 Drawing Sheets

(56) References Cited

U.S. PATENT DOCUMENTS

| | | |
|---|---|---|
| 989,069 A | 4/1911 | Siewert |
| 1,199,766 A | 10/1916 | Dewstow |
| 1,322,326 A | 11/1919 | Miller |
| 1,526,045 A | 2/1925 | Brown |
| 1,558,114 A | 10/1925 | Morrison |
| 1,612,446 A | 12/1926 | Larson |
| 1,643,281 A | 9/1927 | Baumann et al. |
| 1,784,248 A | 12/1930 | Nolen |
| 1,786,048 A | 12/1930 | Williams |
| 1,844,809 A | 2/1932 | Spaugh |
| 1,941,214 A | 12/1933 | Kusterle |
| 2,595,597 A | 5/1952 | Morseth |
| 2,743,132 A | 4/1956 | Zahn |
| 2,766,008 A | 10/1956 | Hurd |
| 2,771,319 A | 11/1956 | Renquist |
| 2,797,124 A | 6/1957 | Hauptli |
| 2,906,323 A | 9/1959 | Macy |
| 2,958,083 A | 11/1960 | Shook et al. |
| 2,976,082 A | 3/1961 | Dahlman |
| 3,146,824 A | 9/1964 | Veilleux |
| 3,184,261 A | 5/1965 | Young |
| 3,384,413 A | 5/1968 | Sargent |
| 3,467,431 A | 9/1969 | Turcotte |
| 3,494,658 A | 2/1970 | Maes |
| 3,498,666 A | 3/1970 | Harrawood |
| 3,515,428 A | 6/1970 | Killion |
| 3,549,198 A | 12/1970 | Cappello |
| 3,622,193 A | 11/1971 | Schmidt |
| 3,656,802 A | 4/1972 | White |
| 3,667,802 A | 6/1972 | Love |
| 3,759,568 A | 9/1973 | Unruh |
| 3,768,540 A | 10/1973 | McSwain |
| 3,768,595 A | 10/1973 | Kelly, Jr. |
| 3,774,958 A | 11/1973 | Thorpe |
| 3,785,694 A | 1/1974 | Sargent |
| 3,819,082 A | 6/1974 | Rosenvold |
| 3,820,840 A | 6/1974 | Forsberg |
| 3,829,154 A | 8/1974 | Becknell |
| 3,833,255 A | 9/1974 | Logue |
| 3,854,770 A | 12/1974 | Grise et al. |
| 3,861,737 A | 1/1975 | Kirkbride |
| 3,868,142 A | 2/1975 | Bachand et al. |
| 3,910,629 A | 10/1975 | Woodard |
| 3,913,969 A | 10/1975 | Hoch |
| 3,924,889 A | 12/1975 | Gogush |
| 3,942,830 A | 3/1976 | Woodard |
| 3,957,068 A | 5/1976 | Cox |
| 3,964,781 A | 6/1976 | Fenton |
| 3,975,047 A | 8/1976 | McClellan |
| 3,986,749 A | 10/1976 | Hull et al. |
| 4,003,301 A | 1/1977 | Norton |
| 4,012,021 A | 3/1977 | Duceppe |
| 4,014,590 A | 3/1977 | Schulz, Jr. |
| 4,023,857 A | 5/1977 | Killion |
| 4,030,780 A | 6/1977 | Petretti |
| 4,032,186 A | 6/1977 | Pickering et al. |
| 4,046,416 A | 9/1977 | Penner |
| 4,050,734 A | 9/1977 | Richard |
| 4,054,011 A | 10/1977 | Ensink et al. |
| 4,067,603 A | 1/1978 | Fenton |
| 4,082,347 A | 4/1978 | Petretti |
| 4,088,234 A | 5/1978 | Smith |
| 4,095,838 A | 6/1978 | Beeler |
| 4,095,840 A | 6/1978 | Woodard |
| 4,098,477 A | 7/1978 | Perez |
| 4,126,351 A | 11/1978 | Peteretti |
| 4,129,331 A | 12/1978 | Lawson et al. |
| 4,140,339 A | 2/1979 | Fredin |
| 4,157,202 A | 6/1979 | Bachand |
| 4,162,100 A | 7/1979 | Muscillo |
| 4,172,614 A | 10/1979 | Guido, Jr. |
| 4,189,178 A | 2/1980 | Cramaro |
| 4,200,330 A | 4/1980 | Scott |
| 4,201,254 A | 5/1980 | Fehric |
| 4,212,492 A | 7/1980 | Johnsen |
| 4,218,087 A | 8/1980 | Neville |
| 4,223,941 A | 9/1980 | Janzen et al. |
| 4,225,175 A | 9/1980 | Fredin |
| 4,230,359 A | 10/1980 | Smith |
| 4,234,224 A | 11/1980 | Rosenvold |
| 4,248,475 A | 2/1981 | Johnsen |
| 4,269,443 A | 5/1981 | Farmer |
| 4,272,119 A | 6/1981 | Adams |
| 4,277,220 A | 7/1981 | Wiley |
| 4,281,872 A | 8/1981 | Biancale |
| 4,302,043 A | 11/1981 | Dimmer et al. |
| 4,302,044 A | 11/1981 | Sims |
| 4,341,416 A | 7/1982 | Richard |
| 4,380,350 A | 4/1983 | Block |
| 4,416,485 A | 11/1983 | Long |
| RE31,746 E | 11/1984 | Dimmer et al. |
| 4,484,777 A | 11/1984 | Michel |
| 4,505,512 A | 3/1985 | Schmeichel et al. |
| 4,516,802 A | 5/1985 | Compton |
| 4,518,193 A | 5/1985 | Heider et al. |
| 4,529,098 A | 7/1985 | Heider et al. |
| 4,544,196 A | 10/1985 | Schmeichel et al. |
| 4,583,777 A | 4/1986 | Myburgh |
| 4,585,267 A | 4/1986 | Friesen |
| 4,627,658 A | 12/1986 | Vold et al. |
| 4,657,062 A | 4/1987 | Tuerk |
| 4,659,134 A | 4/1987 | Johnson |
| 4,668,007 A | 5/1987 | Sloan |
| 4,673,208 A | 6/1987 | Tsukamoto |
| 4,691,957 A | 9/1987 | Ellingson |
| 4,700,985 A | 10/1987 | Whitehead |
| 4,703,971 A | 11/1987 | Schmeichel et al. |
| 4,715,089 A | 12/1987 | Schema |
| 4,725,090 A | 2/1988 | Weaver |
| 4,740,029 A | 4/1988 | Tuerk |
| 4,757,854 A | 7/1988 | Rippberger |
| 4,801,171 A | 1/1989 | Weaver |
| 4,823,707 A | 4/1989 | Salsbury et al. |
| 4,834,445 A | 5/1989 | Odegaard |
| 4,854,630 A | 8/1989 | Biancale |
| 4,858,984 A | 8/1989 | Weaver |
| 4,874,196 A | 10/1989 | Goldstein et al. |
| 4,893,864 A | 1/1990 | Bailey |
| 4,915,439 A | 4/1990 | Cramaro |
| 4,923,240 A | 5/1990 | Swanson |
| 4,944,551 A | 7/1990 | Hardy, Jr. |
| 4,948,193 A | 8/1990 | Weaver |
| 4,981,411 A | 1/1991 | Ramsey |
| 4,995,663 A | 2/1991 | Weaver et al. |
| 5,002,328 A | 3/1991 | Michel |
| 5,004,032 A | 4/1991 | Pedersen |
| 5,007,672 A | 4/1991 | Koch |
| 5,026,109 A | 6/1991 | Merlot, Jr. |
| 5,031,955 A | 7/1991 | Searfoss |
| 5,050,923 A | 9/1991 | Petelka |
| 5,058,652 A | 10/1991 | Wheatley et al. |
| 5,058,956 A | 10/1991 | Godwin, Sr. |
| 5,064,240 A | 11/1991 | Kuss et al. |
| 5,067,767 A | 11/1991 | Biancale |
| 5,076,338 A | 12/1991 | Schmeichel et al. |
| 5,080,422 A | 1/1992 | DeMonte et al. |
| 5,080,423 A | 1/1992 | Merlot et al. |
| 5,102,182 A | 4/1992 | Haddad, Jr. |
| 5,112,097 A | 5/1992 | Turner, Jr. |
| 5,129,698 A | 7/1992 | Cohrs et al. |
| 5,145,230 A | 9/1992 | Biancale |
| 5,152,575 A | 10/1992 | DeMonte et al. |
| 5,174,353 A | 12/1992 | Schmeichel et al. |
| 5,179,991 A | 1/1993 | Haddad, Jr. |
| 5,180,203 A | 1/1993 | Goudy |
| 5,190,341 A | 3/1993 | Simard |
| 5,203,055 A | 4/1993 | Broadwater, Sr. |
| 5,211,440 A | 5/1993 | Cramaro |
| 5,211,441 A | 5/1993 | Barkus et al. |
| 5,218,743 A | 6/1993 | Miller |
| 5,238,287 A | 8/1993 | Haddad, Jr. |
| 5,238,359 A | 8/1993 | Chen |
| 5,240,303 A | 8/1993 | Hageman |
| 5,240,304 A | 8/1993 | Cramaro et al. |

(56) References Cited

U.S. PATENT DOCUMENTS

| | | | |
|---|---|---|---|
| 5,253,914 A | 10/1993 | Biancale |
| 5,275,459 A | 1/1994 | Haddad, Jr. |
| 5,281,074 A | 1/1994 | Mashuda |
| 5,288,123 A | 2/1994 | Dimmer |
| 5,303,972 A | 4/1994 | Heider et al. |
| 5,328,228 A | 7/1994 | Klassen |
| 5,380,058 A | 1/1995 | Short et al. |
| 5,385,377 A | 1/1995 | Girard |
| 5,388,882 A | 2/1995 | Russell et al. |
| 5,429,408 A | 7/1995 | Henning et al. |
| 5,435,627 A | 7/1995 | Fleming |
| 5,462,102 A | 10/1995 | Searfoss |
| 5,466,030 A | 11/1995 | Harris et al. |
| 5,474,354 A | 12/1995 | Beale |
| 5,482,347 A | 1/1996 | Clarys et al. |
| 5,487,584 A | 1/1996 | Jespersen |
| 5,491,021 A | 2/1996 | Tolliver et al. |
| 5,498,057 A | 3/1996 | Reina et al. |
| 5,498,066 A | 3/1996 | Cuthbertson et al. |
| 5,524,953 A | 6/1996 | Shaer |
| 5,538,313 A | 7/1996 | Henning |
| 5,542,734 A | 8/1996 | Burchett et al. |
| 5,549,347 A | 8/1996 | Anderson |
| 5,573,295 A | 11/1996 | Haddad, Jr. |
| 5,658,037 A | 8/1997 | Evans et al. |
| 5,664,824 A | 9/1997 | Stephens et al. |
| 5,692,793 A | 12/1997 | Wilson et al. |
| 5,713,712 A | 2/1998 | McIntyre |
| 5,743,700 A | 4/1998 | Wood, Jr. et al. |
| 5,752,735 A | 5/1998 | Fleming et al. |
| 5,762,002 A | 6/1998 | Dahlin et al. |
| 5,765,901 A | 6/1998 | Wilkens |
| 5,775,765 A | 7/1998 | Kintz |
| 5,803,528 A | 9/1998 | Haddad, Jr. |
| 5,823,067 A | 10/1998 | Clarys et al. |
| 5,823,604 A | 10/1998 | Chenowth |
| 5,829,819 A | 11/1998 | Searfoss |
| 5,865,499 A | 2/1999 | Keyser |
| RE36,135 E | 3/1999 | O'Brian |
| 5,887,937 A | 3/1999 | Searfoss |
| 5,924,758 A | 7/1999 | Dimmer et al. |
| 5,938,270 A | 8/1999 | Swanson et al. |
| 5,944,374 A | 8/1999 | Searfoss |
| 5,954,384 A | 9/1999 | Jones |
| 5,957,523 A | 9/1999 | Haddad, Jr. |
| 5,964,236 A | 10/1999 | Berke |
| D427,135 S | 6/2000 | Searfoss |
| 6,135,534 A | 10/2000 | Schmeichel |
| 6,142,553 A | 11/2000 | Bodecker |
| 6,199,935 B1 | 3/2001 | Waltz et al. |
| 6,206,449 B1 | 3/2001 | Searfoss |
| 6,237,985 B1 | 5/2001 | O'Brian |
| 6,257,646 B1 | 7/2001 | Searfoss |
| 6,322,041 B1 | 11/2001 | Schmeichel |
| 6,513,856 B1 | 2/2003 | Swanson et al. |
| 6,527,331 B2 | 3/2003 | Searfoss |
| 6,637,800 B2 | 10/2003 | Henning |
| 6,641,199 B1 | 11/2003 | Hicks |
| 6,659,531 B2 | 12/2003 | Searfoss |
| 6,685,251 B2 | 2/2004 | Dumas |
| 6,715,817 B2 | 4/2004 | Nolan et al. |
| 6,783,168 B2 | 8/2004 | Searfoss |
| 6,808,220 B2 | 10/2004 | Wheatley |
| 6,857,682 B2 | 2/2005 | Eggers et al. |
| 6,886,879 B2 | 5/2005 | Nolan et al. |
| 6,916,060 B2 | 7/2005 | Searfoss |
| 6,979,043 B2 | 12/2005 | Leischner et al. |
| 7,032,950 B2 | 4/2006 | Eggers et al. |
| 7,188,887 B1 | 3/2007 | Schmeichel |
| 7,195,304 B1 | 3/2007 | Schmeichel |
| 7,246,838 B2 | 7/2007 | Searfoss |
| 7,275,780 B2 | 10/2007 | Boyd et al. |
| 7,841,642 B2 | 11/2010 | Schaefer |
| 2002/0021018 A1 | 2/2002 | Royer |
| 2002/0084672 A1 | 7/2002 | Searfoss |
| 2003/0052505 A1 | 3/2003 | Searfoss |
| 2003/0052506 A1 | 3/2003 | Royer |
| 2004/0245800 A1 | 12/2004 | Wheatley |
| 2005/0057068 A1 | 3/2005 | Searfoss |
| 2005/0062314 A1 | 3/2005 | Searfoss |
| 2008/0042466 A1 | 2/2008 | Searfoss |
| 2009/0206629 A1 | 8/2009 | Damsi |
| 2010/0164246 A1 | 7/2010 | Schaefer |
| 2011/0227363 A1 | 9/2011 | Smith et al. |
| 2013/0241230 A1 | 9/2013 | Knight |

FOREIGN PATENT DOCUMENTS

| | | |
|---|---|---|
| GB | 2 041 839 A | 9/1980 |
| GB | 1 587 813 A | 4/1981 |

OTHER PUBLICATIONS

Agri-Cover, Inc., AGRI-COVER® SRT-2™ AGRI-COVER® Electric SRT-2™ Spool Roll Tarp Hand and Electric Owner's Manual, Owner's Manual, 2008, ACI Jamestown, North Dakota.

Agri-Cover, Inc., AGRI-COVER® EZ-LOC® Roll-Up Tarp EZ-LOC® Hand and Electric Installation Instructions and Owner's Manual, Instructions and Owner's Manual, 2008, 25pgs, Jamestown, North Dakota.

Agri-Cover, Inc., AGRI-COVER® EZ-LOC® Roll-Up Tarp for Farm Truck, Grain Cart, and Semi-Trailer Boxes Owner's Manual, Owner's Manual, 2007, ACI, Jamestown, North Dakota.

Agri-Cover, Inc., EZ-LOC Electric Roll-Up Tarp Tarp Kit Instructions, Instruction Manual, 2006, 7pgs, ACI, Jamestown, North Dakota.

Agri-Cover, Inc., SRT-2™ Spool Roll Tarp Features, web site details for agricultural trailer tarp systems, 2008, 6 pgs, www.agricover.com/index.php/products/, ACI, Jamestown, North Dakota.

Agri-Cover, Inc., SRT™ Spool Roll Tarp Hand and Electric Owner's Manual, Owner's Manual, 2006, 23pgs, ACI, Jamestown, North Dakota.

Agri-Cover, Rocker Switch Instructions for Hardware Kit # 40604, Instruction Manual, Mar. 13, 2007, 2pgs, ACI, Jamestown, North Dakota.

Shur-Co., Rear Aluminum Cap W/Flap & Cable Return, Instruction Manual, Sep. 16, 2003, 2pgs, www.shurco.com, Shur-Co., Yankton, South Dakota.

Shur-Co., Replacement Parts: Roll Tarp—Electric Swing Arm Shur-Lok® : General Parts, replacement part order form, published online at least as early as May 5, 2009, www.ShopShurco.com, 6pgs, Shur-Co., Yankton, South Dakota.

Roll-Rite, LLC, Front to Back—Flip Style Tarp Systems Owner's Manual, Sep. 2010, Roll-Rite, LLC, Alger, Michigan.

Roll-Rite, LLC, Tarp Return Owner's Manual, Jun. 2011, Roll-Rite, LLC, Alger, Michigan.

Roll-Rite, LLC, Side to Side Manual Tarp Conversion (Single & Dual Arm—Drive & Pass. Stowing) Owner's Manual, Jun. 2011, Roll-Rite, LLC, Alger, Michigan.

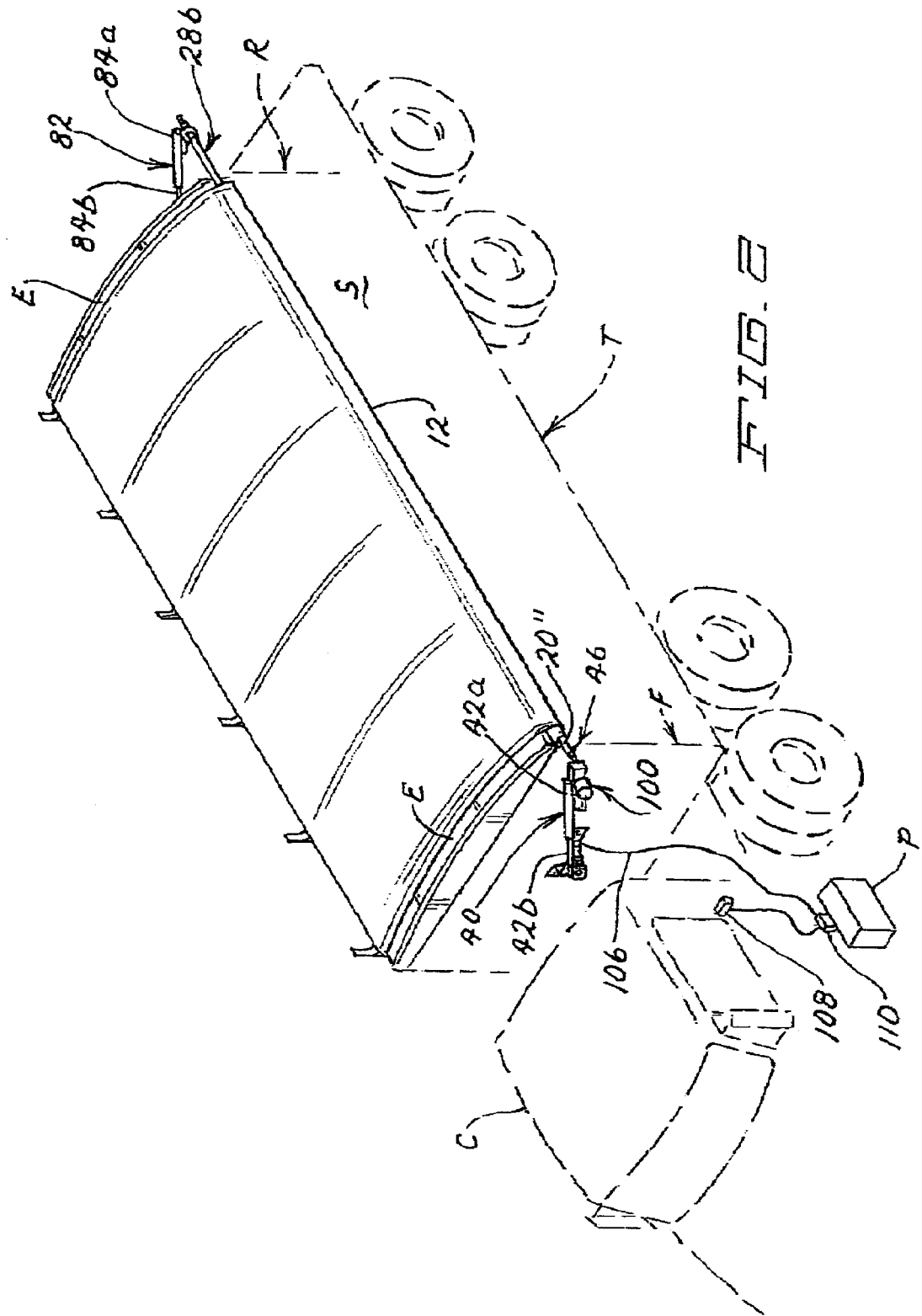

ROLL-UP TARP CONVERSION KIT AND METHODS OF USE

RELATED APPLICATIONS

The present application is a continuation of U.S. patent application Ser. No. 13/901,102, filed May 23, 2013, which claimed the benefit under 35 U.S.C. 119(e) of U.S. provisional application Ser. No. 61/651,309, filed May 24, 2012, each of which is hereby incorporated herein by reference.

FIELD OF THE INVENTION

Conversion kits and methods of the present invention can be used to convert a manually operated roll-up tarp apparatus to a motorized roll-up tarp apparatus. Various preferred embodiments of the present invention can be used to convert a manually operated roll-up tarp apparatus in a manner that allows the converted roll-up tarp to operate either as a motorized apparatus or a manually operated crank apparatus, as desired or needed. Methods of installing and using the conversion kit are also disclosed.

BACKGROUND OF THE INVENTION

Roll-up tarp assemblies for covering truck cargo boxes having an open top are widely utilized in the trucking industry for transporting grain and other commodity products. For example, U.S. Pat. No. 4,505,512 (Schmeichel et al.) discloses a roll-up tarp apparatus for an open truck box or trailer. The roll-up tarp assembly includes a tarp made from a flexible material. The tarp is secured along one side to the open top of the truck box. The other side of the tarp is attached to a tubular member with a plurality of flexible straps. A crank apparatus connected to the tubular member by a U-joint and collar assembly is utilized to roll the tubular member transversely of the truck box opening so as to selectively cover the open top truck box with the tarp or uncover the open top truck box. A plurality of hooks are attached to the side of the truck box opposite of the side to which the tarp is fixedly secured. The hooks retain the tubular member when the tarp is covering the truck box. Other known roll-up tarp assemblies utilize a hand crank mechanism to control the movement of the tubular member, but the general trend is to utilize a motorized arm that is interconnected to the tubular member to minimize the work needed to open and close the truck box and to simplify that activity.

In motorized or motor driven roll-up tarp assemblies, a biasing member can be used to assist the motor in moving the tubular member in an unroll direction. Typically, a bungee cord is interconnected to a collar located on the tubular member and the bungee cord extends from the collar, around a corner of the truck box and along at least part of the length of the truck box where the second end of the bungee cord is attached. As the tarp rolls up on the tubular member or unrolls from the tubular member, front and rear arms guide the tubular member across the top of the truck box that frames the top opening and supports the tarp over the top opening of the truck box.

Other well known roll-up tarp assemblies include springs and other mechanisms to bias the arms in the unroll direction. See, for example, U.S. Pat. No. 7,188,887 (Schmeichel) and U.S. Pat. No. 7,195,304 (Schmeichel).

The present invention addresses limitations and problems associated with the related art.

SUMMARY OF THE INVENTION

Conversion kits and disclosed methods of the present invention can be used to convert a manually operated roll-up tarp apparatus to a motorized or motor driven roll-up tarp apparatus. In further preferred embodiments, the roll-up tarp apparatus can be used either as a motorized apparatus or a manually cranked apparatus, as desired or required. Preferred methods for installing and using the conversion kit are also disclosed.

In accordance with an aspect of the invention, a conversion kit may include a front arm assembly and a rear arm assembly. The front arm assembly may include an upper arm and a lower arm that may be telescopically connected to each other. Alternatively, the front arm assembly may include an upper arm that may be telescopically connected to an existing lower arm. A drive assembly may be connected to the upper arm. The drive assembly may include a motive source that is operatively connected to, and which is able to rotate an output or drive shaft. The output shaft may be removably connectable to a roll tube extension that is connected to an existing tarp roll tube or roll tube. Advantageously, the connection between the output shaft and the roll tube extension feature two distinct modes of attachment that result in two distinct operational modes. In a first mode, output shaft may be removably connectable to one end of an extension such the output shaft and the extension rotate together. In the first mode of operation, a transverse clevis pin that extends through both the output shaft and the extension may be used to secure the output shaft to the extension. In a second mode, the output shaft is rotatably retained by the extension, so that the output shaft may rotate freely with respect to the extension to which it is attached when the clevis pin is not engaged with the output shaft and the roll tube extension. In the second mode of operation, a first pin, preferably a roll pin, engages a portion of a peripheral groove of the output shaft and a portion of the extension may be used to rotatably retain the output shaft to the extension. In both modes of operation, a second end of the extension may be connected to a roll tube of an existing tarp system. The front arm assembly may also include elements such as a lower bracket assembly with which to connect the lower arm to a truck body, and one or more biasing elements that may be configured and arrange to bias the front arm assembly towards one side of a truck body. Preferably, the front arm is biased in the unroll direction.

In accordance with another aspect of the invention, a rear arm assembly of the conversion kit is largely similar to the front arm assembly of the kit, in that it may include an upper arm that may be telescopically connected to a lower arm, and it may include elements such as a lower bracket assembly with which to connect the lower arm to a truck body, and one or more biasing elements that may be configured and arranged to bias the rear arm assembly toward one side of a truck body. Preferably, the rear arm is biased in the unroll direction. However, the rear arm assembly does differ from the front arm assembly in several important respects. The main differences are that the rear arm assembly does not include a drive assembly that is connected to an upper arm by a bracket, or a roll tube extension that operatively connects a tarp roll tube to the drive assembly. Instead, the upper arm of the rear arm assembly includes a bracket that rotatably is configured and arranged to rotatably support an existing roll tube. In an exemplary embodiment, the bracket may be provided with an aperture that is sized to rotatably receive an end of a roll tube. In some embodiments, the aperture of the bracket may be provided with a friction reducing surface that facilitates rotation of the roll tube relative to the rear arm assembly. The bracket may be configured so that it allows a splined end of an existing roll tube to project beyond one end thereof. This allows the splined end of the roll tube to be engaged by a splined socket of a manually operable hand crank, should the drive assembly of the front arm assembly be disconnected or otherwise rendered inoperable. Both of the front and rear arm assemblies are preferably connected to respective sides of the truck box and are spring biased in the unroll direction.

Should a tarp assembly need to be operated manually after the conversion kit is installed, perhaps due to motor or power failure, the preferred conversion kit is arranged and configured to also be used as a manual assembly. By removing the clevis pin, the modes of operation may be changed and the motive source effectively disabled, wherein the roll tube can turn freely such that a crank handle can be then attached to the splined end at the rear end of the elongated roll tube to operate the assembly to roll and unroll the flexible tarp as needed. To secure the output shaft of the drive assembly to the roll tube extension in this crank mode, a roll pin or the like can be inserted into a groove within the output shaft via an aperture in the roll tube extension.

In a further aspect of the invention, the conversion kit is for converting a manually operated roll-up tarp assembly to a motor driven roll-up tarp assembly. The manually operated roll-up tarp assembly preferably including a flexible tarp and a roll tube upon which the flexible tarp can be gathered and from which the flexible tarp can be unfurled when the flexible tarp is gathered upon the roll tube. The roll tube having a first length and first and second ends and the first end including a splined connecting member. Preferably, the roll tube is modified by removing a portion of the roll tube proximate the second end to form a modified roll tube that has a second length; wherein the second length is shorter than the first length. The conversion kit to be installed preferably includes a first arm assembly including a motor having an output shaft, wherein the output shaft has an outer surface and the outer surface includes a groove; a first pin; a roll tube extension for attachment to the modified roll tube; the roll tube extension having first end and second ends and an inner surface that defines a hollow interior proximate the first end; the first end being constructed and shaped so that the first end can slide onto the output shaft to become connected therewith, and the second end being connectable to the modified roll tube so as to be an extension thereof when connected thereto; wherein the roll tube extension further includes a first aperture that can be aligned with the groove when the roll tube extension is connected with the output shaft such that the first pin can be inserted into the first aperture and the groove such that the roll tube extension is engaged with the output shaft and cannot be disengaged therefrom, but wherein the roll tube extension and the first pin can rotate around the output shaft independent thereof when the first pin resides at least partially in the groove.

In a preferred embodiment, the conversion kit further includes a clevis pin; wherein the output shaft further includes a pin aperture; and wherein the roll tube extension further includes a set of two of second apertures that can be aligned with the output shaft in such a manner that the set of two of second apertures can receive the clevis pin and the clevis pin can pass through the pin aperture and both of the set of two second apertures to secure the roll tube extension to the output shaft so that the extension tube will turn with the output shaft when the clevis pin is secured in the set of two of second apertures and the pin aperture.

In preferred embodiments, the conversion kit further includes a clevis pin, the output shaft further includes a pin aperture and the roll tube extension further includes a set of two of second apertures that can be aligned with the output shaft in such a manner that the set of two of second apertures can receive the clevis pin and the clevis pin can pass through both of the two second apertures and the pin aperture to secure the roll tube extension to the output shaft so that the extension tube will turn with the output shaft when the clevis pin is secured in the set of two of second apertures and the pin aperture. In various embodiments, the clevis pin is inserted into the two second apertures and the pin aperture to secure the roll tube extension to the output shaft so that the extension tube will turn with the output shaft.

In a further embodiment, when the crank arm from the manually operated roll-tarp assembly is retained, the method can further comprise the step of removing the clevis pin from the two second apertures and the pin aperture to permit the roll tube extension to freely rotate about the output shaft so that the roll tube can turn independently of the output shaft so that the crank arm can be connected to the splined connecting member on the first end to turn the roll tube and either gather or unfurl the flexible tarp.

A further aspect of the present invention is a method of converting a manually operated roll-up tarp assembly having a crank arm, to a motor driven roll-up tarp assembly. The preferred method comprises the steps of: 1) providing a roll-up tarp conversion kit including: a first arm assembly including a motor having an output shaft, wherein the output shaft has an outer surface and the outer surface includes a groove; a first pin; a roll tube extension for attachment to the modified roll tube; the roll tube extension having first and second end segments and an inner surface that defines a hollow interior proximate the first end segment; the first end segment being constructed and shaped so that the first end segment can slide onto the output shaft to become connected therewith, and the second end segment being connectable to the modified roll tube so as to be an extension thereof when connected thereto; wherein the roll tube extension further includes a first aperture that can be aligned with the groove when the roll tube extension is connected with the output shaft such that the first pin can be inserted into the first aperture and the groove such that the roll tube extension is engaged with the output shaft and cannot be disengaged therefrom, but wherein the roll tube extension and the first pin can rotate around the output shaft independently thereof when the first pin resides at least partially within the groove; 2) making certain a predetermined measurement to determine where to position a cut on along the greatest length of the roll tube to achieve a desired result; 3) cutting off a portion of the elongated roll tube at the determined position so as to shorten the elongated roll tube as desired to form a modified elongated roll tube; 4) securing the second end segment of the roll tube extension to the modified elongated roll tube; 5) securing the first arm assembly to the truck box; 6) securing the first end segment of the roll tube extension to the output shaft; and 7) forcing the first pin into the first aperture so that the first pin resides at least partially within the groove so that the first pin can prevent the roll tube extension from disengaging from the output shaft, but such that the roll tube extension can rotate freely about the output shaft.

These and various other advantages and features of novelty which characterize the present invention are pointed out with particularity in the claims annexed hereto and forming a part hereof. However, for a better understanding of the invention, its advantages and objects obtained by its use, reference should be made to the drawings which form a further part hereof, and to the accompanying descriptive matter, in which there is illustrated and described exemplary embodiments of the present invention.

BRIEF DESCRIPTION OF THE DRAWINGS

In the drawings, in which corresponding reference numerals and letters indicate corresponding parts of the various embodiments throughout the several views, and in which the various embodiments generally differ only in the manner described and/or shown, but otherwise include corresponding parts;

FIG. 2 is a partial, perspective view of a preferred conversion kit assembly 38 operatively secured to the trailer truck T of FIG. 1;

DETAILED DESCRIPTION

Figure 1A:
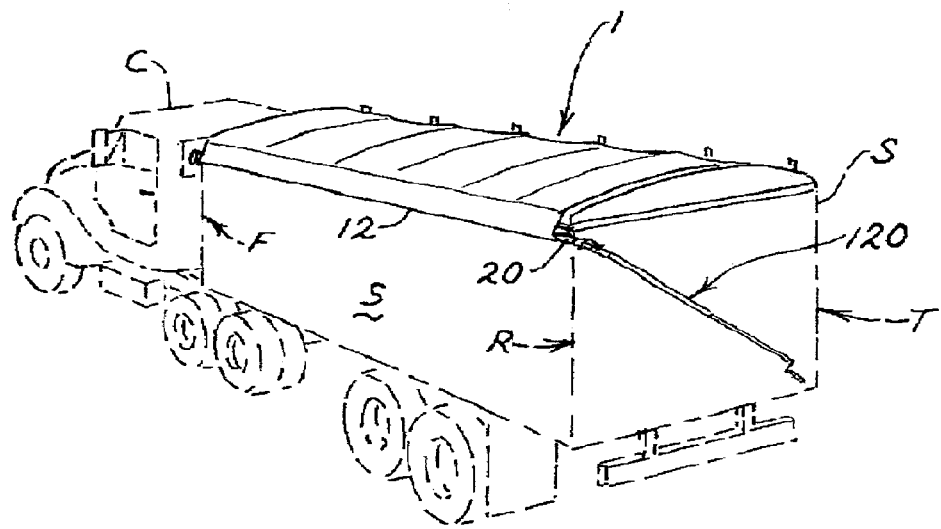
FIG. 1A is a partial, perspective view of a trailer truck C including a tractor trailer T having a conventional hand crank-operated tarp assembly 1 attached thereto, all of which can be found among prior art trailer trucks.
Figure 1B:
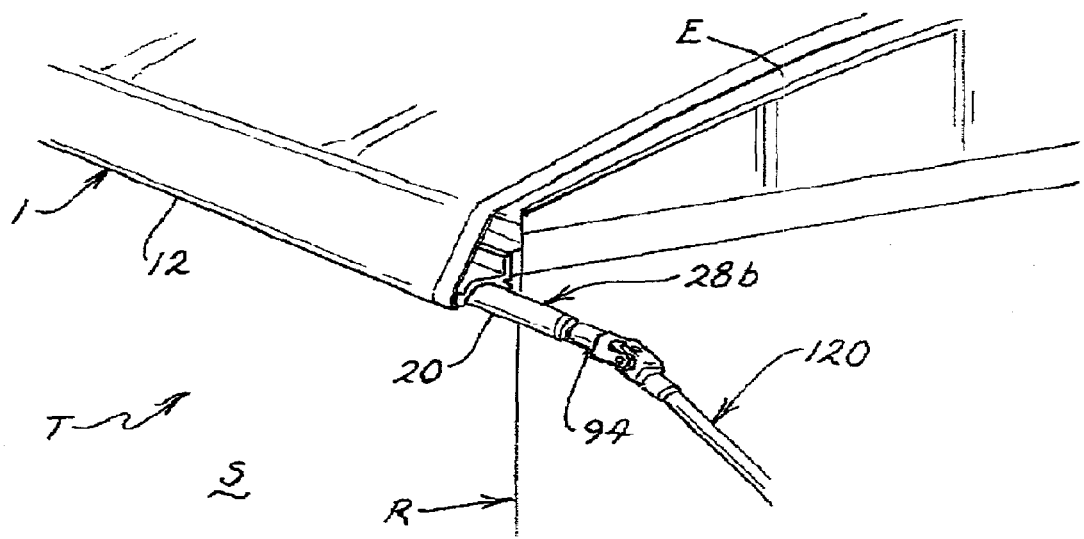
FIG. 1B is a partial, enlarged view of a rear corner of the prior art trailer T of FIG. 1A illustrating a crank arm 120 operatively connected to a spline 94.
Figure 1C:
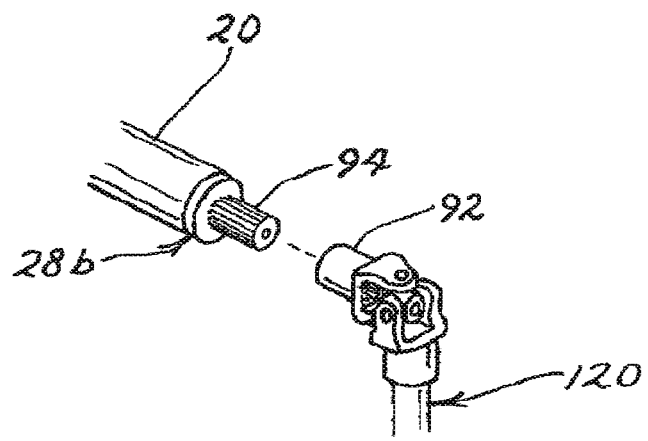
FIG. 1C is a partial, exploded view of the prior art crank arm 120 of FIGS. 1A-1B showing the pivotal connector 92 disconnected from the spline 94.
Figure 1D:
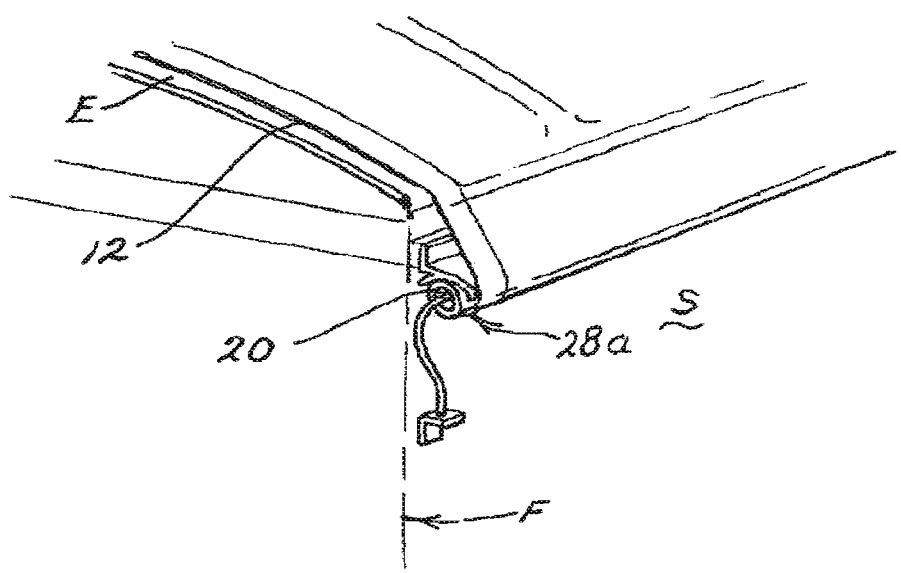
FIG. 1D is a partial, enlarged view of a front corner of the prior art trailer T of FIG. 1A.

Referring now to the drawing figures, a prior art trailer truck having a crank operated roll tarp assembly 1 is illustrated in FIGS. 1A-1D. The trailer T includes a box opening (not shown; obstructed by tarp 12, which covers the box opening in FIG. 1A), a front end F, a rear end R and two lateral sides S. The crank operated tarp assembly 1 includes a flexible cover or tarp 12 secured to a roll tube 20. One end of the flexible tarp 12 is secured to one lateral side S and the other end is connected to the elongated roll tube 20. The roll tube 20 will preferably include a splined connecting member or spline 94, preferably proximate the rear end R of the trailer T and a crank arm 120, preferably connected to the roll tube 20 proximate the rear end R of the trailer T.

Referring now also to FIGS. 2-13, the preferred conversion kit 38 of the present invention is effective to transform such a manually operated roll tarp assembly having a manually powered crank arm 120, as illustrated in FIGS. 1A-1D into a motorized tarp assembly. Preferred embodiments of the conversion kit 38 are illustrated in FIGS. 2-13 and discussed further below.

Typical prior art manually operated tarp assemblies include a flexible cover 12 that is secured to a truck box T and also to an elongated roll tube 20 having first and second ends 28b, 28a, wherein the second end 28a is generally connected to the truck box T and the first end 28b is generally connected to a crank arm assembly 120 having a pivotal connector 92 for connection to the spline 94 or the like.

Preferred conversion kits 38 of the present invention will include a front arm assembly 40, a rear arm assembly 82, a roll tube extension 46, and lower bracket assemblies 130. A preferred embodiment of the front arm assembly 40 will include an upper arm portion 42a telescopically connected to a lower arm portion 42b and a drive assembly 100 connected to the upper arm 42a by a bracket 56. The drive assembly 100 can be interconnected to a roll tube extension 46 that can be attached to a modified roll tube 20' that is made by shortening the roll tube 20 of an existing tarp system such as tarp system 1 of FIGS. 1A-1D.

The preferred roll tube extension 46 has first and second end segments 50, 48. The second end segment 48 may be connected to a modified roll tube 20' after the modified roll tube is made by shortening an existing roll tube 20, and such that the roll tube extension is in axial alignment therewith and joined thereto, preferably secured by welding the two tubes together. In some preferred embodiments, the roll tube extension 46 has a diameter that is substantially the same as the diameter of both the roll tube 20 and the modified roll tube 20'. In some embodiments, the second end segment 48 of the roll tube extension 46 may be provided with an axially aligned stub 49a and a shoulder 49b, with the stub 49a configured to be inserted into one end of the modified roll tube 20' (see, in particular, FIG. 13). In some embodiments, the roll tube extension 46 may be secured to the modified roll tube 20' by welding. Alternatively, adhesives or conventional fastening elements such, as set screws, clamps, brackets and/or nuts and bolts can be used to secure the stub 49a to the modified roll tube 20'. In some embodiments, the roll tube extension 46 may include a protective sleeve 47 that may be positioned about the exterior of a portion of the extension 46. The protective sleeve 47 serves to protect the extension 46 and prevents wear thereof by making it easier for the extension 46 to travel over an end cap E of a truck box T. In some embodiments, the protective sleeve 47 may rotate relative to the extension 46. In a preferred embodiment, the sleeve 47 may be formed from plastic material, such as PVC tubing.

Figure 6A:
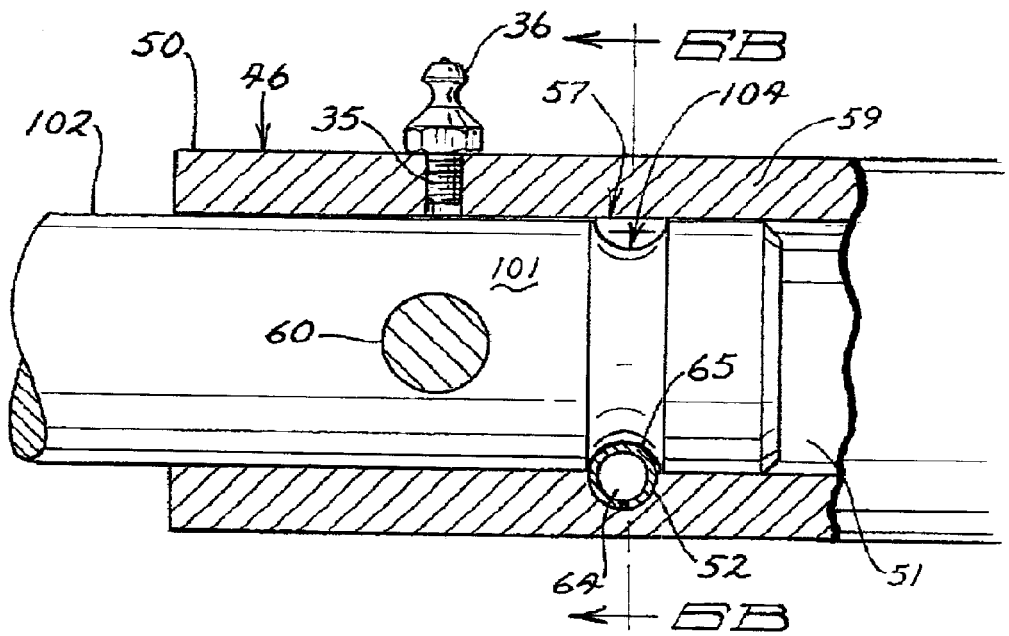
FIG. 6A is an enlarged, partial cross-sectional view of the operative connection between the output shaft 102 of the drive assembly 100 and the roll tube extension 46 of the conversion kit 38 of FIGS. 2 and 4.
Figure 6B:
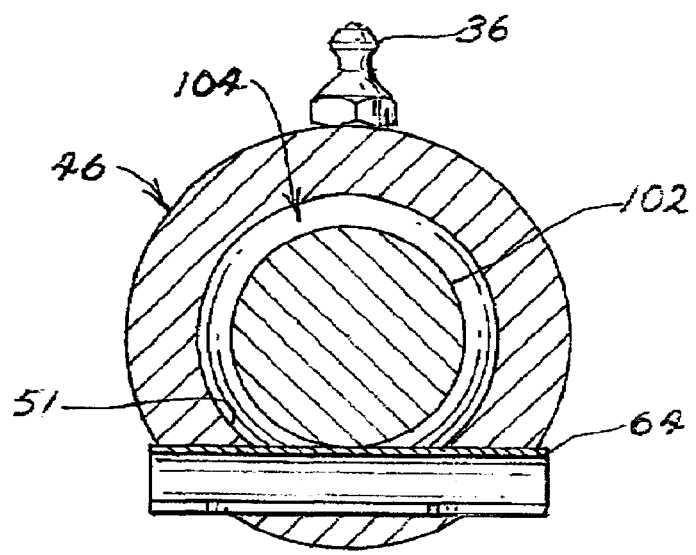
FIG. 6B is a partial, cross-sectional view of the output shaft 102 and the roll tube extension 46, as seen from the line 6B-6B of FIG. 6A, but where the portion of the roll tube extension 46 removed in the cross-sectional view shown in FIG. 6A is restored to show the full cross-sectional view of the roll tube extension 46 and the output shaft 102, wherein the roll tube extension 46 has a groove 58 shown in FIG. 6B in which pin 64 resides, as shown.
Figure 6C:
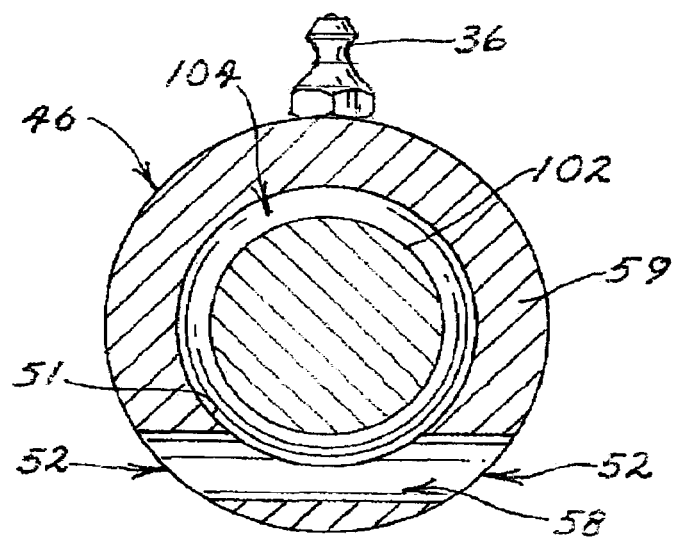
FIG. 6C is a partial, cross-sectional view similar to that shown in FIG. 6B, but where the cross-section of the pin 64 is removed to show the groove 58 in the interior surface 51 of the roll tube extension 46 in which the pin 64 resides in FIGS. 6A and 6B.
Figure 7:
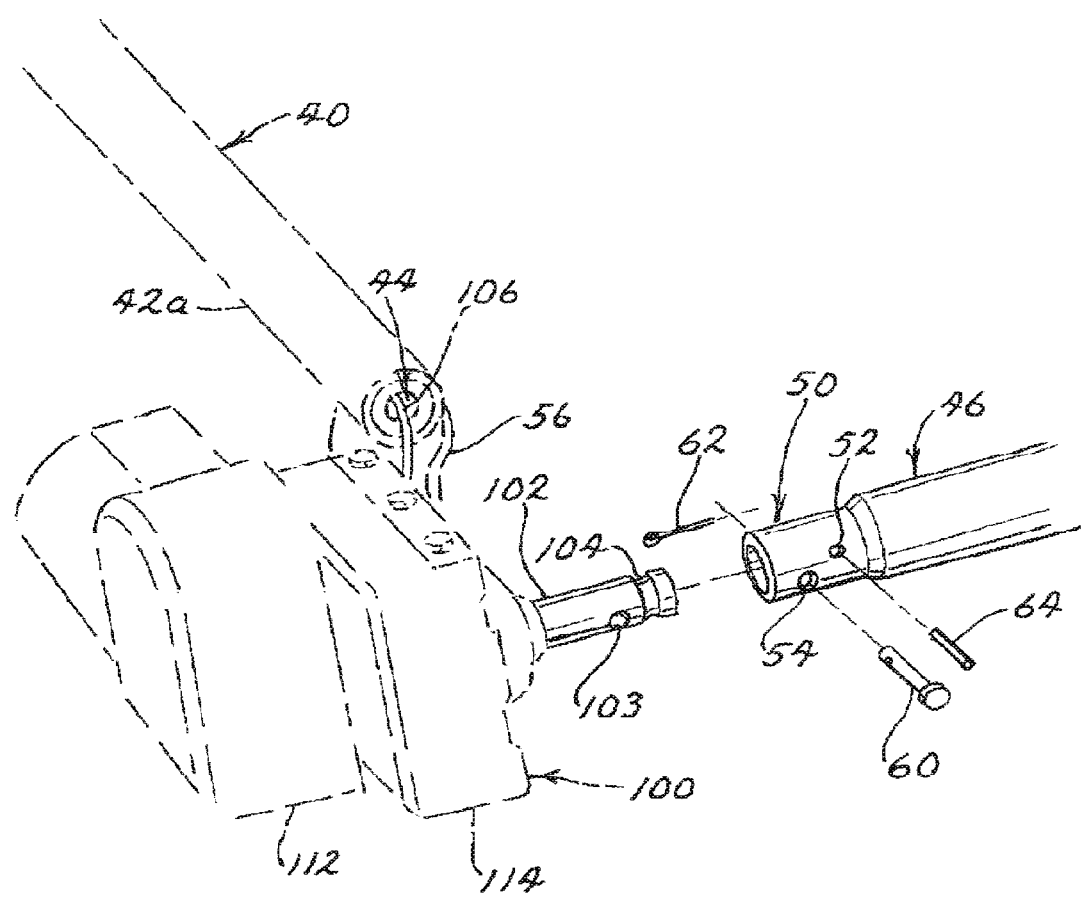
FIG. 7 is a partial, exploded perspective view illustrating the cooperative engagement between the drive assembly 100 and the roll tube extension 46 of FIGS. 2-6 in which the application of a clevis pin 60 and a securing device or cotter pin 62 can form one operative connection and in which the application of a roll pin 64 can form another operative connection.
Figure 8:
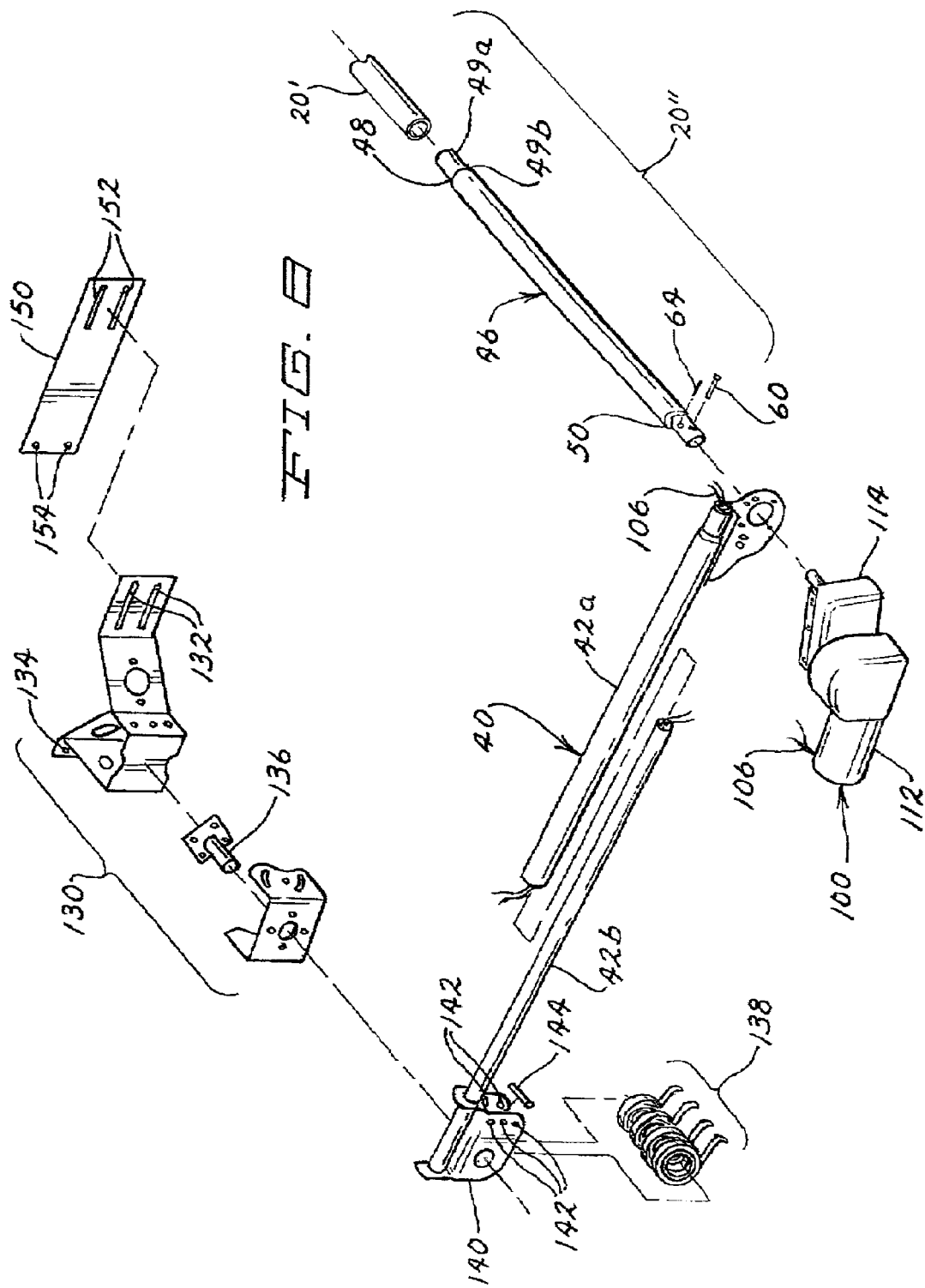
FIG. 8 is a partial, exploded perspective view of an exemplary front arm assembly 40 of the conversion kit 38 of FIGS. 2-7.
Figure 9:
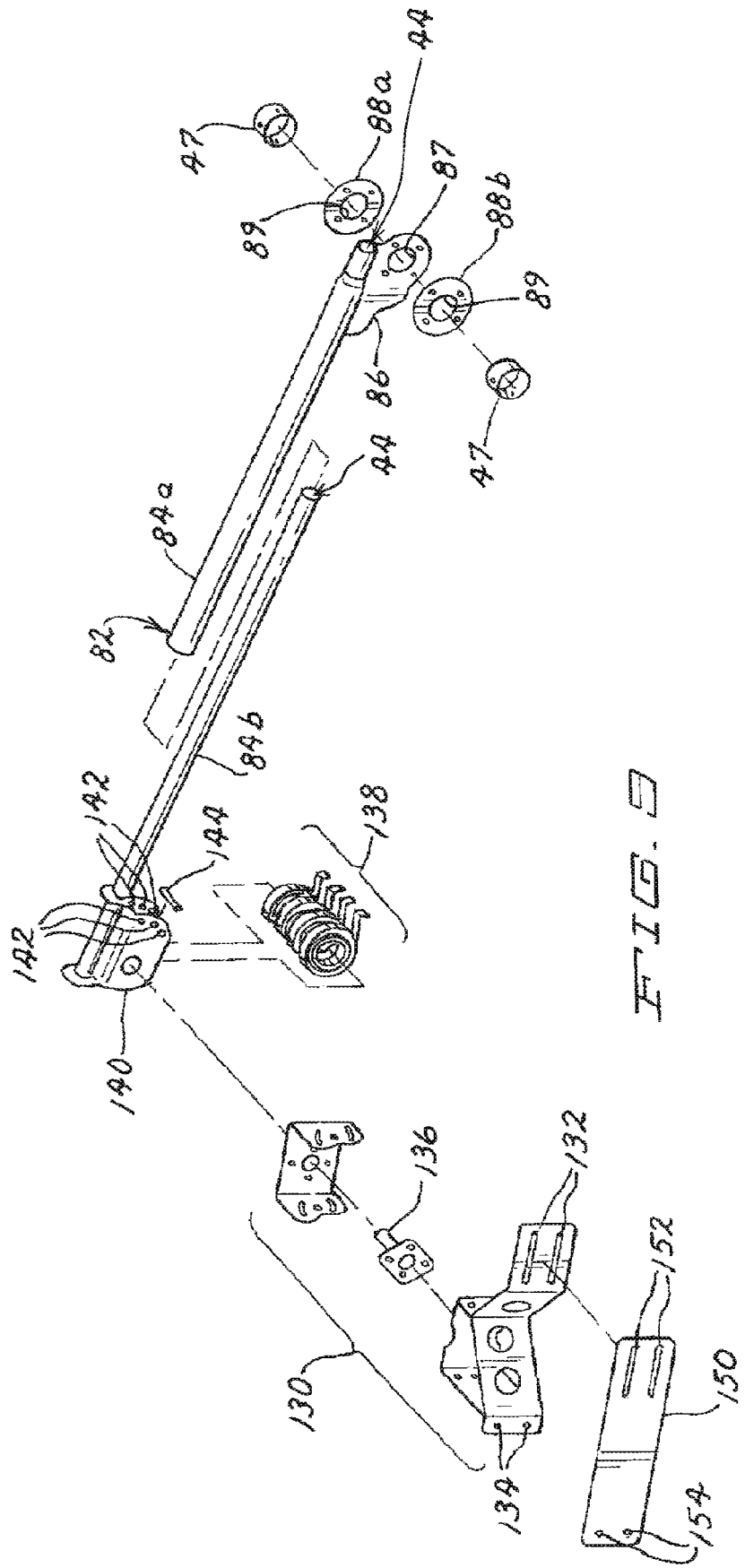
FIG. 9 a partial, exploded perspective view of an exemplary rear arm assembly 82 of the conversion kit 38 of FIG. 2.
Figure 10A:
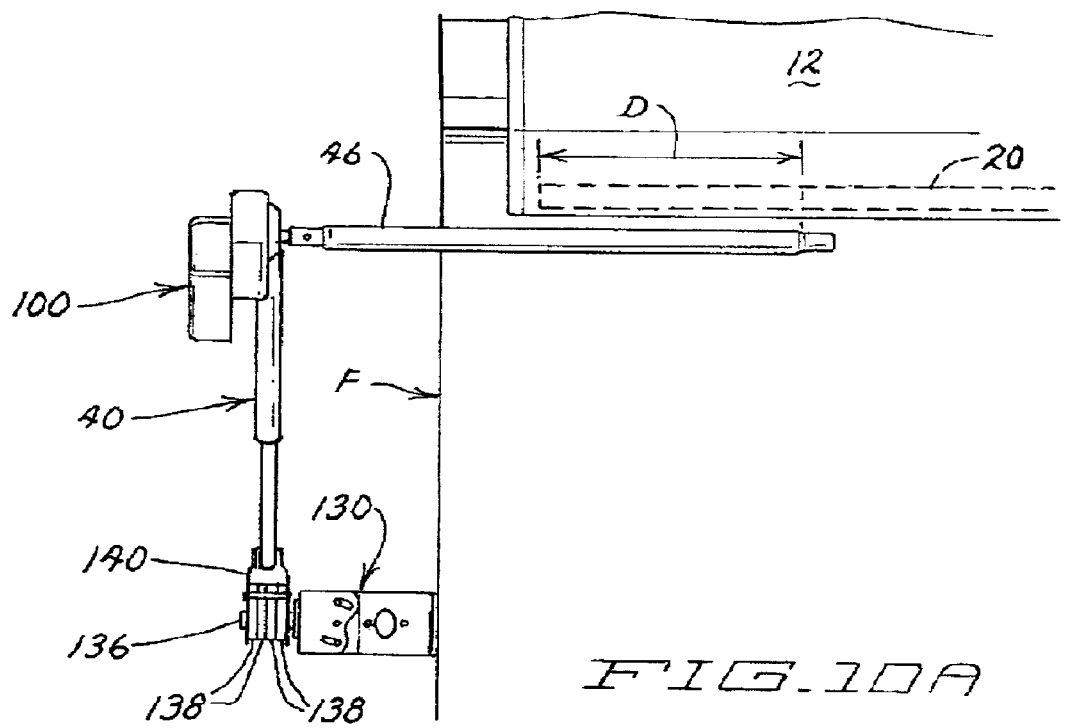
FIG. 10A is an end elevation of a front arm assembly 40 as it may be connected to a vertical front wall F of a truck trailer.
Figure 10B:
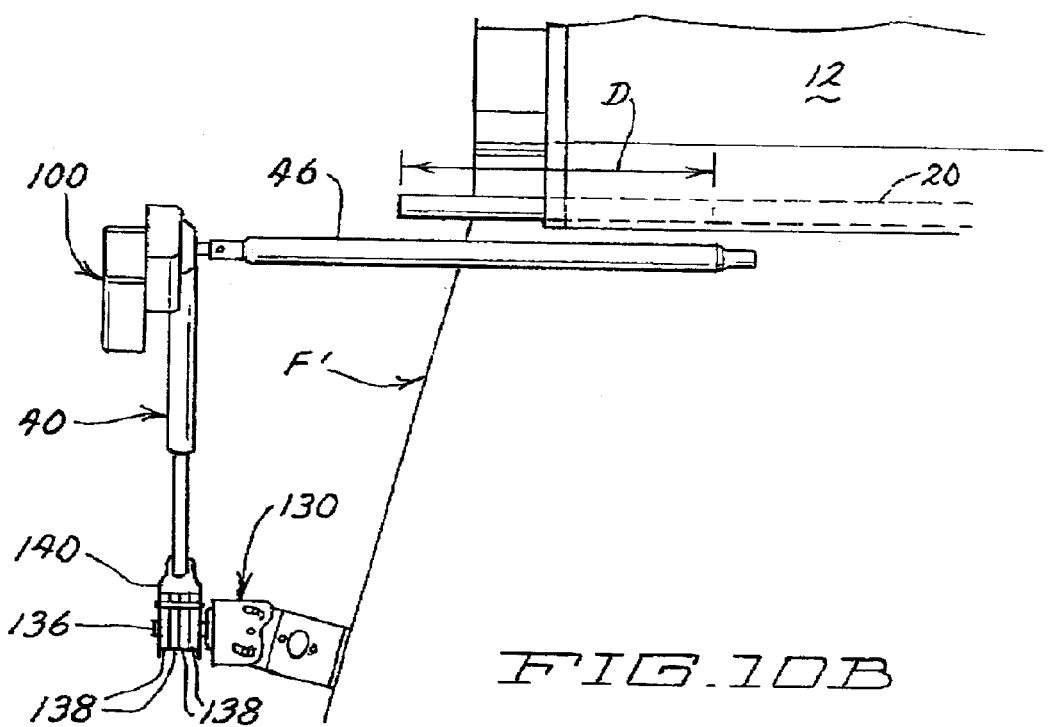
FIG. 10B is an end elevation of a front arm assembly 40 as it may be connected to a slanted front wall F' of a truck trailer.

The first end segment 50 of the roll tube extension 46 may be removably connected to an output shaft 102 of the drive assembly 100 and rotatably secured thereto with a pin 64. Referring now in particular to FIGS. 6A-6C, in preferred embodiments, the pin 64 is insertable into a first aperture 52 that extends through a wall 59 of the roll tube extension 46 proximate the first end segment 50 such that at least a portion of the pin 64 is able to extend into an interior space defined in part by a circumferential, peripheral groove 104 in the outer surface 101 of the output shaft 102. In the preferred embodiment shown in FIGS. 6A-6C, the pin 64 is preferably a roll pin that can be inserted and frictionally retained within the pin aperture 52. In preferred embodiments, the pin aperture 52 will extend transversely through the wall 59 of the roll tube extension 46, creating a second groove 58 in the inner surface 51 of the roll tube extension 46 that extends from the pin aperture 52 on one side of the roll tube extension 46 to the pin aperture 52 on the other side of the roll tube extension 46. In actual fact, the aperture 52 extends continuous from a fully encircled opening 52 on one side of the roll tube extension 46, partially through the hollow interior of the roll tube extension 46 proximate the first end segment 50 and partially continuing through the wall 59 of the roll tube extension 46 in the second groove 58 formed in the wall 59 of the roll tube extension 46, which continues to the other side of the roll tube extension 46, where it leaves through the opposing wall 59 of the roll tube extension 46 in another fully encircled opening or aperture 52 on the opposite side. In other embodiments, there may be a plurality of radially extending apertures and a plurality of pins.

In preferred embodiments, rotation of the roll tube extension 46 with respect to the output shaft or drive shaft 102 will be enhanced through the use of lubricants. As such, preferred roll tube extensions 46 will include an access port 35 through which lubricant material may be introduced. A preferred access port 35 may include a zerk fitting 36.

The first end segment 50 of the extension 46 may also be removably connected to an output shaft 102 of the drive assembly 100 and secured thereto with a clevis pin 60. In some embodiments, a clevis pin 60 is removably insertable into a diametrically oriented aperture 54 of the extension 46 and through a diametrically oriented aperture 103 in the output shaft 102 of the drive assembly 100. The clevis pin 60 serves to connect the output shaft 102 and the extension 46 together so that they can rotate together. In some embodiments, the clevis pin 60 may include an enlarged end that prevents the clevis from passing through the apertures 54 and 103. In other embodiments, one or more ends of the clevis pin 60 may include a transverse aperture 56 that is configured to receive a cotter pin 62 used to retain the clevis pin 60 within apertures 54 and 103.

Illustrative embodiments of a drive assembly 100 may include a motive source 112 that is operatively connected to an output shaft 102 that is connected to a roll tube 20". In some embodiments, a motive source 112 may be an electrical motor that may be connected to a power source P such as a primary vehicular battery or a secondary auxiliary battery, and controlled by a switch 108. The switch 108 may be positioned in a cab "C" of a vehicle, if desired. In some embodiments, a solenoid 110 may be used to actuate the electrical motor. In such embodiments, a switch 108 may be operatively connected to the solenoid 110. In exemplary embodiments, an electric motor, a solenoid, and a switch may be operatively connected to each other by conventional electrical wiring 106. In various embodiments, some of the wiring may be carried within a hollow interior 44 of the front arm assembly 40.

In some embodiments, the output speed at which a motive source 112 rotates may exceed the rate at which a roll tube is normally rotated. In some embodiments, a motive source may be connected to a gear reducer (not shown). A speed reducing apparatus can effectively reduce the output speed of a motor so that it is compatible with the requirements a tarp cover. In some embodiments, a gear reducer may be combined with an electric motor as a single unit (for example, a Super Winch Power Drive Model No. 719627, available from Super Winch, Inc. of Putnam, Conn.). In some illustrative embodiments, a drive assembly 100 may be connected to an upper arm 42a of a front arm assembly 40. In a preferred embodiment, a bracket 56 may be used to connect the drive assembly 100 to the upper arm 42a. Preferably, the bracket 56 positions the drive assembly 100 so that the output shaft (or drive shaft) 102 can be brought into alignment with the extended modified roll tube 20". In some embodiments, it may be desirable to modify the output of a combined motive source 112 and gear reducer such as the Super Winch Power Drive discussed above or equivalents thereof. In such instances, some embodiments may be provided with a gearbox 114 that includes an output shaft 102 that may be connected to an extension 46. The gearbox 114 can be of many configurations. One preferred configuration is that disclosed in U.S. patent application Ser. No. 12/463,049, the disclosure of which is hereby incorporated herein by reference.

Figure 3:
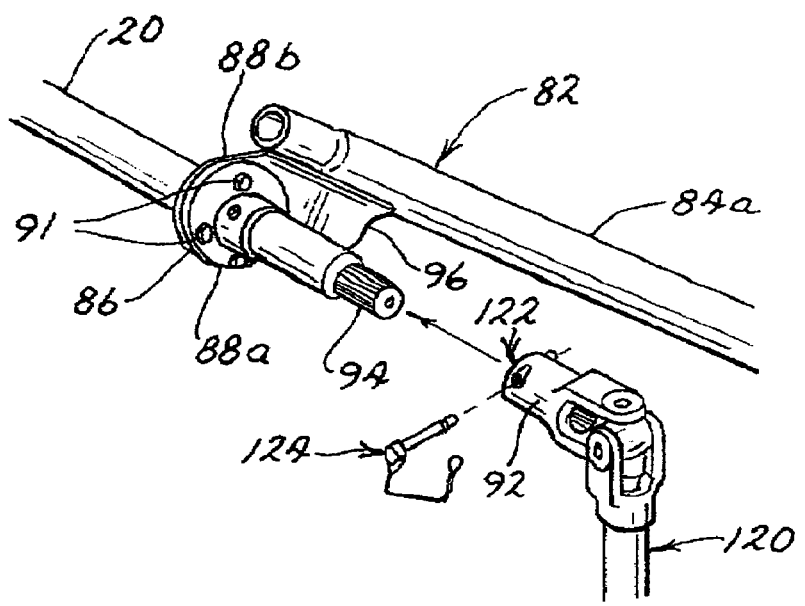
FIG. 3 is an enlarged, partial perspective view of a portion of the conversion kit assembly 38 of FIG. 2 illustrating the cooperative engagement between a bracket 86 on the upper arm of a rear arm assembly 82 and a splined end of the roll tube 20, wherein the splined end of the roll tube is rotatably retained by the bracket of the rear arm assembly.
Figure 4:
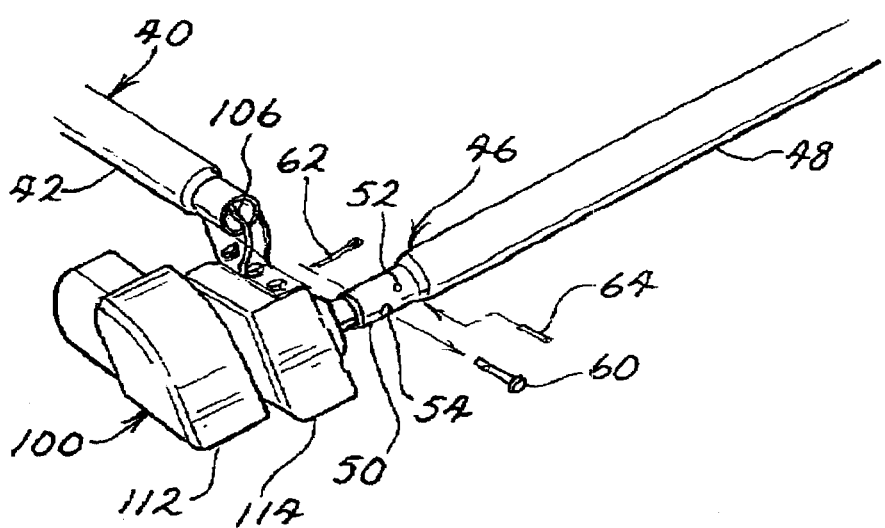
FIG. 4 is an enlarged, partial perspective view of the front end of the conversion kit assembly 38 of FIG. 2, showing a portion of the front arm assembly 40 in which preferred pins for variously securing the roll tube extension 46 to the output shaft 102 of a drive assembly or motor 100 are shown in exploded view for clarity.
Figure 5:
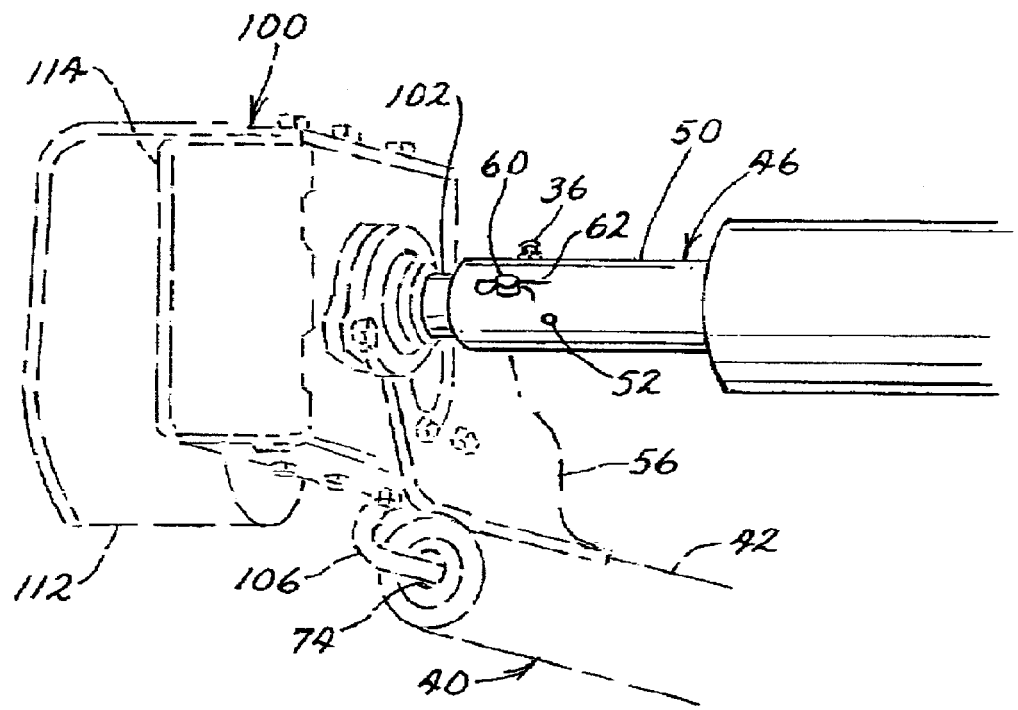
FIG. 5 is an enlarged, partial perspective view of a drive assembly or motor 100 of a front arm assembly 40 of the conversion kit 38 of FIG. 2; the drive assembly 100 including an output shaft 102 that is operatively connected to the first end segment 50 of the roll tube extension 46.

The first end 28b of the roll tube 20 is preferably equipped with a spline 94 such that once the conversion kit 38 is operatively installed, the rear arm assembly 82 can be operated with a hand crank arm 120 by removal of the clevis pin 60 as will be discussed in further detail below. It is likely that the tarp system 1 to be converted already includes a spline 94 for operation with a crank arm 120. However, if an end of a roll tube 20 does not already have a spline 94, a splined end similar to what is illustrated in FIG. 3 may be provided to the roll tube 20 in a retroactive manner. That is, an adaptor (not shown) may be outfitted with a splined end and then attached to one end of the roll tube 20.

In some preferred embodiments, the lower arm 42b and the upper arm 42a of the front arm assembly 40 may have hollow interiors 44 that may serve as a storage area for electrical cords 106. In even more preferred embodiments, the hollow interior 44 of the upper and lower arms may include a wear plate lining 74 that is made of a low-friction material to reduce wear on the electrical cords 106. Examples of such preferred wear plate lining materials include nylon, high density polyethylene (HDPE), a combination thereof or the like.

The front arm assembly 40 preferably includes an upper end 42a telescopically connected to a lower end 42b. The front arm assembly 40 is preferably biased with a plurality of clock springs 138 in the unroll direction. The clock springs 138 are preferably attached to connecting portion 140, which is secured to the front end F of the tractor trailer T with corresponding bracket 130 using conventional fastening elements such as nuts and bolts (not shown). The fastening elements are preferably arranged and configured such to allow the bracket 130 to be adjusted so as to accommodate slanted end walls (see, for example, FIGS. 10B and 11B). Preferably, the bracket 130 is positioned about 42-50 inches from the top of the trailer T. The bracket 130 may include a rod or post 136 on which the one or more clock springs 138 or the like can be secured. Preferably, bushings are secured around the rod 136 proximate where the rod is inserted through the connecting portion 140. The clock spring(s) 138 can also be secured to a bolt 144 of the connecting portion 140 of the lower arm 42b such that the clock springs 138 bias the front arm assembly 40 in the unroll direction. In some illustrative embodiments, the connecting portion 140 may include a plurality of apertures 142 that are circumferentially spaced from each other, such that the bolt 144 can be positioned at different positions such that the amount of bias is adjustable. The connecting portion 140 can be sized such that the clock springs 138 are generally contained by the connecting portion 140 and the clock springs 138 will not move laterally along the rod 136.

A preferred rear arm assembly 82 is largely similar to the front arm assembly 40 in that is may include an upper arm 84a telescopically connected to a lower arm 84b. However, the rear arm assembly 82 differs from the front arm assembly 40 in that it does not include a drive assembly 100 or a roll tube extension 46. Instead, the rear arm assembly 82 has an upper arm 84a with a bracket 86 having an aperture 87. Aperture 87 of the bracket 86, which is used to connect the rear arm assembly 82 to an existing roll tube 20, may include a friction-reducing element that facilitates rotation of the roll tube 20 relative to the rear arm assembly 82. In some embodiments the friction-reducing element may comprise, for example, a roller bearing, a journal bearing, or a strip of low friction material such as high-density polyethylene (HDPE) or the like. In an illustrative embodiment, the bracket 86 may include one or more plates 88a and 88b having central apertures 89 that are sized to be congruent with the aperture 87 of bracket 86. The apertures 89 of the plates 88a, 88b augment the surface area of the aperture 87 of the bracket 86 so that wear between the bracket 86 and the roll tube 20 can be reduced. In some embodiments, the apertures 89 of the plates 88a, 88b may also be provided with friction reducing elements. The conversion kit 38 may also include at least one collar 47 that can limit the amount of travel between the bracket 86 and the roll tube 20. In some embodiments, a collar 47 may be provided with a set screw (not shown) that enables the collar 47 to be secured to a roll tube 20. In preferred embodiments, the collar 47 is secured on the roll tube 20 to generally prevent the bracket 86 from moving significantly along the length of the roll tube 20 in an axial direction. In alternate embodiments, a second lock collar (not shown) can be secured on the roll tube proximate the spline 94.

The preferred rear arm assembly 82 of the present invention includes an upper arm 84a telescopically connected to a lower arm 84b. The rear arm assembly 82 further includes a bracket 86 having inner and outer plates 88a, 88b. The bracket 86 and the inner and outer plates 88a, 88b, which may be connected to each other by one or more fastening elements such as nuts and bolts, include apertures that are concentrically aligned with each other and which are sized to rotatably receive a roll tube 20 or an extended modified roll tube 20". The apertures of the bracket 86 and plates 88a, 88b may be provided with one or more friction reducing elements to facilitate rotation of the roll tube 20 or an extended modified roll tube 20".

Identical to the front arm assembly 40, the rear arm assembly 82 preferably includes an upper end 84a telescopically connected to a lower end 84b. The rear arm assembly 82 is preferably biased with a lower biasing member 138. Biasing springs 138 are preferably connected to a connecting portion 140 that is secured to the front end F of the tractor trailer T with corresponding bracket 130 using conventional fastening elements such as nuts and bolts (not shown). The fastening elements are preferably arranged and configured such to allow the bracket 130 to be adjusted so as to accommodate slanted end walls (see, for example, FIGS. 10B and 11B). Preferably, the bracket 130 is positioned about 42-50 inches from the top of the trailer T. The bracket 130 may include a rod or post 136 on which one or more clock springs 138 or the like can be secured. Preferably, bushings are secured around the rod 136 proximate where the rod 136 is inserted through the connecting portion 140. The clock spring(s) 138 can also be secured to a bolt 144 of the connecting portion 140 of the lower arm 42b such that the clock springs 138 bias the rear arm assembly 82 in the unroll direction. In some illustrative embodiments, the connecting portion 140 may include a plurality of apertures 142 that are circumferentially spaced from each other, such that the bolt 144 can be positioned at different positions such that the amount of biasing force is adjustable. The connecting portion 140 can be sized such that the clock springs 138 are generally contained by the connecting portion 140 and the clock springs 138 will not move laterally along the rod 136.

Various preferred embodiments of the conversion kit 38 may include one or more bracing elements 150. A brace element 150 may be used to reinforce a connection between a lower bracket assembly 130 and a wall of a truck T to which the lower bracket assembly 130 is secured. In some embodiments, a brace element 150 may be positioned against an inner surface of a truck wall (not shown) and secured with fastening elements (not shown) that are used to secure a lower bracket assembly 130 to the truck wall. In an illustrative embodiment, each brace element 150 may comprise a plate that includes slots 152 and apertures 154 that correspond to attachment slots 132 and apertures 134 of a lower bracket assembly 130. It is noted that the bracket assemblies 130, connecting portions 140 and brace elements 150 for the front arm assembly 40 and the rear arm assembly 82 are preferably identical and operate in a similar fashion.

It will be understood that front arm assembly 40 and rear arm assembly 82 can be interchangeable in that drive assembly 100 need not be constrained for installed only on the front end or cab C of the truck box T. It will be understood, however, that it is most common that a source of power P is located proximate the truck cab C and that it will typically be most desirable to install the conversion kit 38 having drive assembly 100 at the front. It is further believed that it is easiest to use a crank arm 120 when positioned at the rear of the truck box T.

In preferred embodiments, the connection between the output shaft 102 and the roll tube extension 46 will preferably feature two distinct modes of attachment that result in two distinct operational modes. In a first mode, output shaft 102 may be removably connectable to one end of the roll tube extension 46 such the output shaft 102 and the extension 46 rotate together. In the first mode of operation, the transverse clevis pin 60 that extends through both the output shaft 102 and the set of two apertures 54 in the roll tube extension 46 proximate the first end segment 50 can be used to secure the output shaft 102 to the roll tube extension 46. In a second mode, the output shaft 102 is rotatably retained by the extension 46, so that the output shaft 102 may rotate freely or independently with respect to the extension 46 to which it is attached when the clevis pin 60 is not engaged with the output shaft 102 and the roll tube extension 46. In the second mode of operation, the roll tube extension 46 includes a groove 58 that extends from a fully encircled opening 52 on one side of the roll tube extension 46 to a second fully encircled opening 52 on the opposite side, and cuts into the inner surface 51 that otherwise defines a hollow interior in the roll tube extension 46 to create the groove 58 that extends from one opening 52 to the other opening 52. A first pin 64, preferably a roll pin inserted into the fully encircled opening or pin aperture 52, preferable engages both a portion of the peripheral groove 104 on the outer surface 101 of the output shaft 102 and a portion of inner groove 58 through the wall 59 of the roll tube extension 46 can be used to rotatably retain the roll tube extension 46 to the output shaft 102 in the second mode in which the roll tube extension 46 can freely rotate with respect to the output shaft 102.

To install the conversion kit 38 of the present invention, it is preferred to first remove the tractor or cab C from the truck box T to provide better working space and also remove any existing returns such as cable return elastic cords or the like. Then, it is preferred to remove any U-clamps or other similar devices (not shown) that secure the flexible tarp 12 to the elongated roll tube 20. Next, slide the roll tube 20 forward or rearward until the roll tube 20 will support the rear arm assembly 82, which is under tension. The rear arm assembly can then be lifted so that the roll tube 20 and the aperture 87 of bracket 86 are aligned with the spline 94 and the roll tube 20 and the aperture 87 can then be slid onto the roll tube 20. In various embodiments, collar 47 may be slid onto the roll tube before it is incorporated into the bracket 86. In further preferred embodiments, plates 88*a*, 88*b* may be installed on either side of the bracket 86. Plates 88*a*, 88*b* and bracket 86 can be secured together with fastening elements 91 such as nuts and bolts via apertures 89. In further embodiments, a second collar 47 may be installed opposite the bracket 86 proximate the spline 94.

Figure 11A:
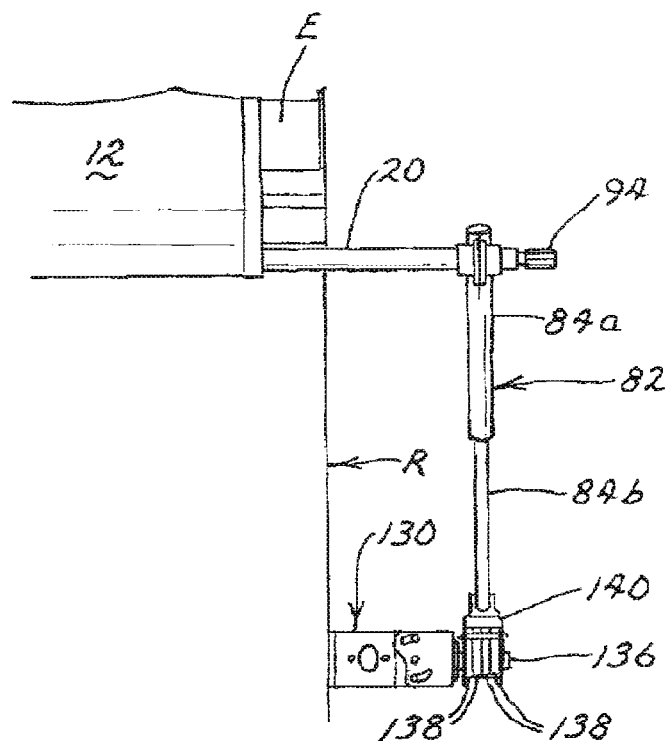
FIG. 11A is an end elevation of a rear arm assembly 82 as it may be connected to a vertical rear wall R of a truck trailer.
Figure 11B:
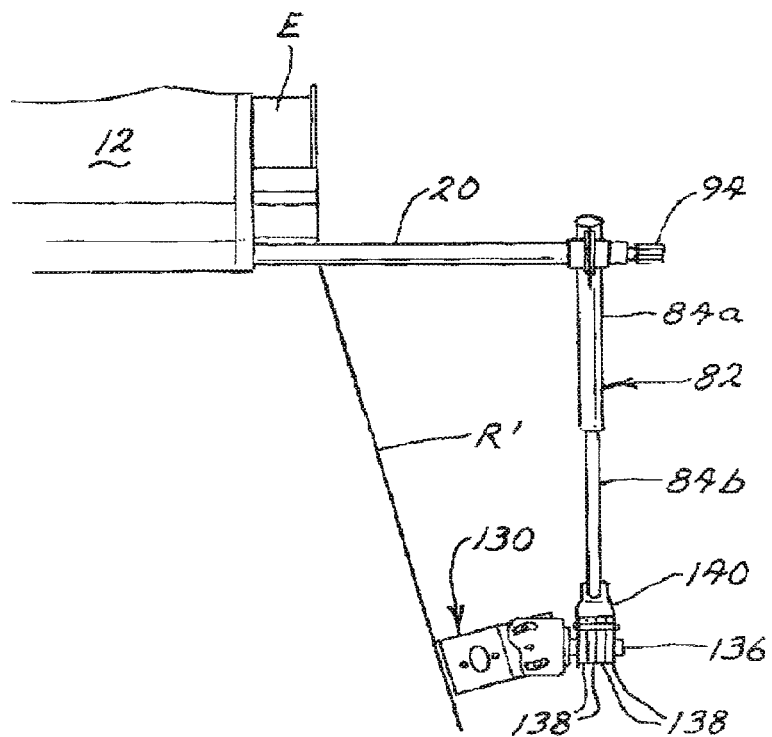
FIG. 11B is an end elevation of a rear arm assembly 82 as it may be connected to a slanted rear wall R' of a truck trailer.
Figure 12:
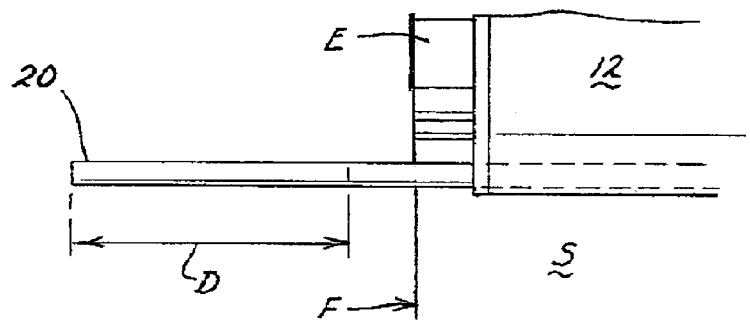
FIG. 12 is a partial end elevation of roll tube 20 that has been partially drawn out of tarp 12 such that a portion of the roll tube 20 can be removed to form a modified roll tube 20' for installation of the conversion kit 38 of FIG. 2.
Figure 13:
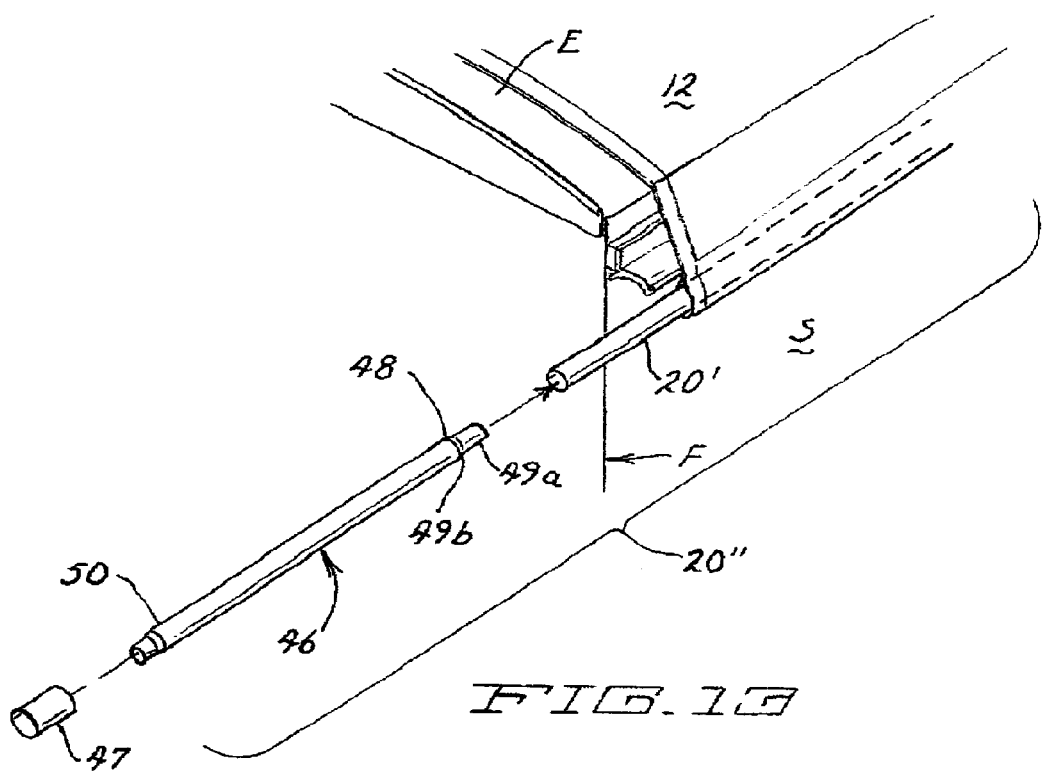
FIG. 13 is a partial, exploded perspective view of a roll tube extension 46 and a portion of a modified roll tube 20' illustrating how the roll tube extension 46 can be connected to the modified roll tube 20' to form an extended modified roll tube 20" by joining the roll tube extension 46 to the modified roll tube 20' during installation of the conversion kit 38 of FIG. 2.

For a trailer truck box T having a rear wall that is vertical, as illustrated in FIG. 11A, it is preferred to align the respective arm assembly 82 with a vertical plane that is approximately 90 degrees relative to the extended modified roll tube 20". For a trailer truck box T having a rear wall that is slanted as is illustrated in FIG. 11B, it is preferred to align the respective arm with a vertical plane that is approximately 90 degrees with respect to the roll tube 20. In preferred embodiments, each arm assembly 40, 82 is secured to a trailer truck T with a lower bracket assembly 130 using fastening elements such as nuts, bolts or the like (not shown).

Next, the roll tube extension 46 of the conversion kit 38 is secured to the output shaft (or drive shaft) 102 with a clevis pin or the like 60 and a cotter key or the like 62. Then, a roll pin 64 may be installed by inserting it into a roll pin aperture 52 such that it is able to engage the groove 104 in the output or drive shaft 102.

Alternatively, the steps of installing the clevis pin 60 and a roll pin 64 may be reversed, so that the roll pin 64 is installed before the clevis pin 60 is installed.

Then, hold the front arm assembly 40 up to the elongated roll tube 20 such that the arm joint is preferably at a 90 degree angle. Then, mark on the flexible tarp 12 the place where the end of the shoulder 49*b* of the roll tube extension 46 ends. Measure the distance "D" between the elongated roll tube 20 and the mark (see, FIGS. 10A-10B and 12). Then, at the rear, remove the plates 88*a*, 88*b* and rear arm 82 from the roll tube 20. At the front, slide the roll tube 20 out of the tarp 12 loop and then shorten the roll tube 20 by the amount measured "D" in order to form a modified roll tube 20'. Such shortening can be completed by cutting with a metal hack saw or the like.

Next, slide the second end segment 48 of the roll tube extension 46 into the modified roll tube 20' and then, preferably, weld and grind the joint smooth to prevent unnecessary wear of the flexible tarp 12. As will be understood, the end of the modified roll tube 20' should be pulled away from the tarp 12 and the trailer T prior to welding to prevent damage of the tarp 12 and trailer T. Furthermore, a rust resistant paint (not shown) is preferably applied to the exposed metal after the welding and grinding processes.

Once the roll-tube extension 46 is operatively secured to the modified roll tube 20' and finished, an extended modified roll tube 20" and the extended modified roll tube 20" can be pushed back into the tarp 12 loop. Then the output or drive shaft 102 can be attached to the roll tube extension 46 with a clevis pin 60 and cotter key 62 and the output shaft 102 can be checked to make sure it is in line with the roll tube extension 46 and extended modified roll tube 20" and resides at an angle of about 90 degrees to the arm 40. The clevis pin 60 can be inserted into both the aperture 54 of the roll tube extension 46 and the clevis pin aperture 103 in the output shaft 102 and then the cotter pin 62 can be used to secure the clevis pin 60 in position.

If the spline 94 is not already present in the existing tarp assembly 1, at the rear end R of the trailer T, preferably the elongated roll tube 20 is trimmed proximate the outside plate 88*b* such that there is about 3 inches of roll tube 20 extending past the outside plate 88*b* when the rear arm 82 is positioned at a 90 degree angle with respect to the roll tube 20. A spline 94 is then preferably secured to the recently trimmed end of the modified roll tube 20', proximate the outside plate 88*a*. The spline 94 is preferred for conversion kits intended to operate as both a motorized arm assembly and also a manual crank arm assembly.

To secure the rear arm 82, slide the inside plate 88*b* onto the roll tube 20, slide the spring arm 82 on and then slide the outside plate 88*a* on the roll tube 20. The rear arm 82 is preferably adjusted so that the outside plate 88*a* is approximately 5 inches from the end of the modified roll tube 20'. As noted above, the rear arm 82 is also preferably secured to the trailer T such that the rear arm 82 is approximately 90 degrees with respect to the modified roll tube 20'. Finally, fastening elements 91 can be used to secure the inside and outside plates 88*a*, 88*b* to each other and the bracket 86. Next, the flexible tarp 12 is reattached to the roll-tube 20 using, for example, the existing U-clamps and screws (not shown). Retighten any other bolts and nuts of the front and rear arm systems and tighten if needed.

Then, the cord 106 can be electrically connected to the power source P of the tractor trailer T. In preferred embodiments, the cords or wires 106 are mounted along the cab C.

Should the conversion kit 38 need to be operated manually, first let the extended modified roll tube 20" hang down loose from the top of the trailer T. Then, remove the clevis pin 60 proximate the output shaft 102 and insert roll pin 64 at least partially within corresponding aperture 52. Removal of the clevis pin 60 and insertion of the roll pin 64 will allow the extended modified roll tube 20" to turn freely yet still be connected to the output shaft 102 of the drive assembly 100. A crank handle 120 can be then attached at the rear end of the extended modified roll tube 20" to operate the assembly to open and close the flexible tarp 12 as needed. In preferred embodiments, the crank arm 120 includes a splined socket 122 that can engage the spline 94. The splined socket 122 can be secured onto the spline 94 with a cotter pin assembly 124 or the like.

The present invention includes a number of preferred embodiments, including the following. A conversion kit 38 for converting a manually operated roll-up tarp assembly 1 to a motor driven roll-up tarp assembly; the manually operated roll-up tarp assembly including a flexible tarp 12 and a roll tube 20 upon which the flexible tarp 12 can be gathered and from which the flexible tarp 12 can be unfurled when the flexible tarp 12 is gathered upon the roll tube 20; the roll tube 20 having a first length and first and second ends 28b, 28a. The conversion kit 38 preferably includes a first arm assembly 40 including a motor 100 having an output shaft 102, wherein the output shaft 102 has an outer surface 101 and the outer surface 101 includes a first groove 104; a first pin 64; and a roll tube extension 46; the roll tube extension 46 having first and second end segments 50, 48 and an inner surface 51 that defines a hollow interior; the first end segment 50 being constructed and shaped so that it can slide onto the output shaft 102 to become connected therewith; wherein the roll tube 20 can be modified by removing a portion of the roll tube 20 proximate the second end 28a to form a modified roll tube 20' that has a second length; wherein the second length is shorter than the first length; and wherein the second end segment 48 of the roll tube extension 46 is connectable to the modified roll tube 20' so as to be an extension thereof and form an extended modified roll rube 20". The roll tube extension 46 preferably includes an inner surface 51 that defines a hollow interior proximate the first end segment 50 and the roll tube extension 46 further includes a first pin aperture 52 that can be aligned with the first groove 104 when the roll tube extension 46 is connected with the output shaft 102 such that the first pin can be inserted into the first pin aperture 52 and the first groove 104 such that the roll tube extension 46 is engaged with the output shaft 102 and cannot be disengaged therefrom without removing the first pin 64.

In other preferred embodiments, the conversion kit 38 will include a first arm assembly 40 including a motor 100 having an output shaft 102, wherein the output shaft 102 has an outer surface 101 and the outer surface includes a first groove 104; a first pin 64; and a roll tube extension 46; wherein the roll tube extension 46 has first and second end segments 50, 48; the first end segment 50 being shaped so that it can slide onto the output shaft 102 so as to become interconnected with the output shaft; wherein the roll tube can be modified by removing a portion of the roll tube 20 proximate the second end 28a to form a modified roll tube 20' that has a second length; wherein the second length is shorter than the first length; and wherein the second end segment 48 of the roll tube extension 46 is connectable with the modified roll tube 20' so as to become an extension thereof; wherein the roll tube extension 46 further includes an inner surface 51 that defines a hollow interior proximate the first end segment 50 and the roll tube extension 46 further includes a second groove 59 that extends into the inner surface 51 proximate the first end segment 50 such that the first pin 64 can reside at least partially in the first and second grooves 58,104 at the same time, when the respective first and second grooves 58,104 are aligned, such that the roll tube extension 46 is engaged with the output shaft 102 and cannot be separated therefrom when the first pin 64 resides at least partially in the first and second grooves 58,104.

In further preferred embodiments, the conversion kit 38 will further include a clevis pin 60; the output shaft 102 will further include a clevis pin aperture 103; and the roll tube extension 46 will further include a set of two second apertures 54 that can be aligned with the output shaft 102 in such a manner that the set of two second apertures 54 can receive the clevis pin 60 and the clevis pin 60 can pass through the clevis pin aperture 103 and both of the set of two second apertures 54 to secure the roll tube extension 46 to the output shaft 102 so that the extension roll tube 20' will turn with the output shaft 102 when the clevis pin 60 is secured in the set of two of second apertures 54 and the clevis pin aperture 103. In further preferred embodiments, the first aperture and the first pin 64 are sized in a manner that permits the first pin 64 to be force fit into the first aperture 52 in manner that prevents the first pin 64 from becoming disengaged therefrom without applying force to the first pin 64 to remove the first pin 64 from the first aperture 52; wherein the roll tube extension 46 and the first pin 64 can rotate around the output shaft 102 independent thereof when the first pin 64 resides at least partially in the first groove 104.

In certain preferred embodiments, the roll tube extension 46 further includes a second groove 58 that extends into an inner surface 51 of the roll tube extension 46 proximate the first end segment 50 such that the first pin 64 can be inserted into the first and second grooves 58, 104 at the same time when the respective first and second grooves 58, 104 are aligned, such that the roll tube extension 46 is engaged with the output shaft 102 and cannot be separated therefrom when the first pin 64 resides in the first and second grooves 58, 104. In these embodiments, the first end segment 50 will preferably include a first pin aperture 52 that can be aligned with the first and second grooves 58, 104; wherein the first pin aperture 52 and the first pin 64 are preferably sized in a manner that permits the first pin 64 to be force fit into the first pin aperture 52 in manner that prevents the first pin 64 from becoming disengaged therefrom without applying force to the first pin 64 to remove the first pin 64 from the first pin aperture 52; wherein the roll tube extension 46 and the first pin 64 can rotate around the output shaft 102 independently thereof when the first pin 64 resides at least partially in the first groove 58 and the first pin aperture 52. In further embodiments, the first pin 64 is preferably a roll pin.

In other preferred embodiments, the roll tube extension 46 further includes a lubrication access port 35 in communication with the hollow interior 44 proximate one end segment 50 to permit the introduction of lubricants into the hollow interior 44.

The lubricant access port 35 is preferably fitted with a zerk fitting 36. In yet other preferred embodiments, the first arm assembly 40 includes an upper portion 42a and a lower portion 42b and the upper portion 42a has a generally hollow interior 44, wherein the upper portion 42a is telescopically connected to the lower portion. In yet other preferred embodiments, the conversion kit 38 also includes a second arm assembly 82 interconnected to the second end 28a of the roll tube 20 and the back of the truck box T.

In yet other preferred embodiments, the conversion kit 38 for converting a manually operated roll-up tarp assembly 1 to a motor driven roll-up tarp assembly; the manually operated roll-up tarp assembly including a flexible tarp 12 and a roll tube 20 upon which the flexible tarp 12 can be gathered and from which the flexible tarp 12 can be unfurled when the flexible tarp 12 is gathered upon the roll tube 20; the roll tube 20 having a first length and first and second ends 28b, 28a; the first end 28b including a splined connecting member 94. The conversion kit 38 includes a first arm assembly including a motor 100 having an output shaft 102, wherein the output shaft 102 has an outer surface 101 and the outer surface 101 includes a first groove 104; the output shaft 102 also including a clevis pin aperture 103; a clevis pin 60; a first pin 64; a roll tube extension 46; the roll tube extension 46 having first and second end segments 50, 48 and one end segment 50 is shaped so that it can slide onto the output shaft 102, so as to become interconnected with the output shaft 102; wherein the roll tube 20 can be modified by removing a portion of the roll tube 20 proximate one end 28a to form a modified roll tube 20' that has a second length; wherein the second length is shorter than the first length; and wherein one end segment 48 of the roll tube extension 46 is connectable with the modified roll tube 20' so as to become an extension thereof. In these embodiments, the roll tube extension 46 preferably includes an inner surface 51 that defines a hollow interior one end segment 50; and the roll tube extension 46 further includes a first pin aperture 52 can be aligned with the first groove 58 when the roll tube extension 46 is connected with the output shaft 102 such that the first pin 64 can be inserted into the first pin aperture 52 and the first groove 104 such that the roll tube extension 46 is engaged with the output shaft 102 and cannot be disengaged therefrom without removing the first pin 64. Preferably, the roll tube extension 46 further includes a second groove 58 that extends into the inner surface 51 through the roll tube extension 46 proximate the end segment 50 such that the first pin 64 can be inserted into the first and second grooves 58, 104 at the same time when the respective first and second grooves 58, 104 are aligned, such that the roll tube extension 46 is engaged with the output shaft 102 and cannot be separated therefrom when the first pin 64 resides in the first and second grooves. The roll tube extension 46 may also include a set of two of apertures 54 that can be aligned with the output shaft 102 in such a manner that the set of two of apertures 54 can receive the clevis pin 60 that can secure the roll tube extension 46 to the output shaft 102 when the clevis pin 60 passes through the clevis pin aperture 103 and both of the set of two apertures 54 when the set of two apertures 54 are aligned with the clevis pin aperture 103. The conversion kit 38 can also include a device 62 to maintain the clevis pin 60 within the set of two apertures 54, preferably a cotter pin.

The present invention preferably includes a method of converting a manually operated roll-up tarp assembly 1 having a crank arm 120, to a motor driven roll-up tarp assembly, wherein the manually operated roll-up tarp assembly 1 includes a flexible tarp 12 and a roll tube 20 upon which the flexible tarp 12 can be gathered and from which the flexible tarp 12 can be unfurled when the flexible tarp 12 is gathered upon the roll tube 20; the roll tube 20 having a first length and first and second ends 28b, 28a; one end 28a including a splined connecting member 94; and wherein the manually operated roll-up tarp assembly is installed on a truck box T. The method preferably includes the steps of: 1) providing a roll-up tarp conversion kit 38 including a first arm assembly 40 including a motor 100 having an output shaft 102, wherein the output shaft 102 has an outer surface 101 and the outer surface 101 includes a groove 104; a first pin 64; and a roll tube extension 46 having first and second end segments 50, 48 and an inner surface 51 that defines a hollow interior proximate one segment end 50; the one end segment 50 being constructed and shaped so that the one end 50 can slide onto the output shaft 102 to become connected therewith; and wherein the roll tube extension 46 further includes a first pin aperture 52 that can be aligned with the groove 104 when the roll tube extension 46 is connected with the output shaft 102 such that the first pin 64 can be inserted into the first pin aperture 52 and the groove 104 such that the roll tube exten-sion 46 is engaged with the output shaft 102 and cannot be disengaged therefrom, but wherein the roll tube extension 46 and the first pin 64 can rotate around the output shaft 102 independently thereof when the first pin 64 resides at least partially within the groove 104; 2) making a predetermined measurement to determine a position along a greatest length of the roll tube 20 in which to cut the roll tube to remove a portion of the roll tube proximate one end so that a modified roll tube 20' is created that has a second length that is shorter than the first length; 3) cutting the elongated roll tube 20 at the determined position to remove a portion of the roll tube 20 proximate the one end and create a modified roll tube 20' that has a second length; and then, in no particular order; 4) securing one end segment of the roll tube extension 46 to the modified roll tube 20' to form an extended modified roll tube 20"; and 5) securing the first arm assembly 40 to the truck box T; 6) securing an end segment of the roll tube extension 46 to the output shaft 102; and 7) inserting the first pin 64 into the first pin aperture 52 so that the first pin 64 resides at least partially within the first groove 104 so that the first pin 64 can prevent the roll tube extension 46 from disengaging from the output shaft 102 such that the roll tube extension 46 can rotate about the output shaft 102.

In yet further preferred embodiments, the conversion kit further will include a clevis pin 60, and the output shaft 102 will further include a clevis pin aperture 103 and the roll tube extension 46 will further include a set of two second apertures 54 that can be aligned with the output shaft 102 in such a manner that the set of two second apertures 54 can receive the clevis pin 60 and the clevis pin 60 can pass through both of the two second apertures 54 and the clevis pin aperture 103 to secure the roll tube extension 46 to the output shaft 102 so that the extension tube 46 will turn with the output shaft 102 when the clevis pin 60 is secured in the set of two of second apertures 54 and the clevis pin aperture 103. In these other preferred embodiments, the method further will further include the step of inserting the clevis pin 60 into the set of two second apertures 54 and the clevis pin aperture 103 to further secure the roll tube extension 46 to the output shaft 102 so that the extension tube 46 will turn with the output shaft 102.

In yet other preferred embodiments, where the manually operated roll-up tarp assembly includes a crank arm 120 and the crank arm from the manually operated roll-tarp assembly 1 is retained; the method further includes the step of removing the clevis pin 60 from the set of two second apertures 54 and the clevis pin aperture 103 to permit the roll tube extension 46 and the roll tube 20' to freely rotate about the output shaft 102 independently of the output shaft 102 so that the crank arm 120 can be connected to the splined connecting member 94 on the end 50 so that the crank arm 94 can be used to manually turn the roll tube 20' to either gather or unfurl the flexible tarp 12.

In yet other preferred embodiments, the conversion kit 38 will further include a second arm assembly 82 and the method will preferably include, in no particular order with respect to the other steps, the step of securing the second arm assembly 82 to the truck box T and securing the second arm assembly 82 to the second end 28b of the roll tube 20 or modified roll tube 20'.

Although the preferred embodiments of the present invention have been described herein, the above description is merely illustrative. Further modification of the invention herein disclosed will occur to those skilled in the respective arts and all such modifications are deemed to be within the scope of the invention as defined by the appended claims.

What is claimed is:

1. A conversion kit for converting a manually operated roll-up tarp assembly to a motorized roll-up tarp assembly that can be manually operated with a hand crank arm; the manually operated roll-up tarp assembly including a flexible tarp, a roll tube, upon which the flexible tarp can be gathered and from which the flexible tarp can be unfurled when the flexible tarp is gathered upon the roll tube, and a rear arm assembly; the roll tube having a first length and first and second ends; the conversion kit comprising:
- a first arm assembly including a motor having an output shaft;
- a first pin; and
- a roll tube extension; the roll tube extension having first and second end segments; the first end segment being constructed and shaped so that the first end segment can slide onto the output shaft to become connected therewith; wherein the roll tube can be modified by removing a portion of the roll tube proximate the second end to form a modified roll tube that has a second length; wherein the second length is shorter than the first length; and wherein the second end segment of the roll tube extension is connectable to the modified roll tube so as to be an extension thereof and part of an extended modified roll tube;
- wherein the roll tube extension includes an inner surface that defines a hollow interior proximate the first end segment; the output shaft includes a first groove and the roll tube extension further includes a first pin aperture, such that the first pin can be inserted into the first pin aperture and the first groove when the output shaft resides in the hollow interior;
- wherein the roll tube extension will be engaged with the output shaft when the output shaft resides in the hollow interior and the first pin is inserted in the first pin aperture and the first groove, such that the roll tube extension will remain engaged with the output shaft but rotate freely with respect to the output shaft, so that the extended modified roll tube can be turned by the hand crank arm.

2. The conversion kit of claim 1, wherein the output shaft has an outer surface and the outer surface includes the first groove, wherein the output shaft further includes a second pin aperture and the roll tube extension further includes a set of two second apertures that can be aligned with the output shaft in such a manner that the set of two second apertures can receive a second pin and the second pin can pass through the second pin aperture and both of the set of two second apertures to secure the roll tube extension to the output shaft so that the roll tube extension will turn with the output shaft when the second pin is secured in the set of two second apertures and the second pin aperture; and wherein the extended modified roll tube can be turned by the hand crank arm to roll and unroll the flexible tarp on the extended modified roll tube if the second pin is removed from the set of two second apertures and the second pin aperture.

3. The conversion kit of claim 1, wherein the second pin is a clevis pin.

4. The conversion kit of claim 1, wherein the output shaft has an outer surface and the outer surface includes the first groove, wherein the first aperture and the first pin are sized in a manner that permits the first pin to be force fit into the first aperture in manner that prevents the first pin from becoming disengaged therefrom without applying force to the first pin to remove the first pin from the first aperture; wherein the roll tube extension and the first pin can rotate around the output shaft independent thereof when the first pin resides at least partially in the first groove.

5. The conversion kit of claim 4, wherein the roll tube extension further includes a lubrication access port in communication with the hollow interior proximate the first end segment to permit the introduction of lubricants into the hollow interior; wherein the lubricant access port is fitted with a zerk fitting.

6. The conversion kit of claim 4, wherein the roll tube extension further includes a second groove that extends into the inner surface of the roll tube extension proximate the first end segment such that the first pin can be inserted into the first and second grooves at the same time when the respective first and second grooves are aligned, such that the roll tube extension is engaged with the output shaft and cannot be separated therefrom when the first pin resides in the first and second grooves.

7. The conversion kit of claim 1, wherein the output shaft of the motor has an outer surface and the outer surface includes a first groove in which the first pin can reside when the roll tube extension is engaged with the output shaft.

8. The conversion kit of claim 1, wherein the first arm assembly includes an upper portion and a lower portion and the upper portion has a generally hollow interior and the upper portion is telescopically connected to the lower portion.

9. The conversion kit of claim 8, wherein the first pin is a roll pin.

10. A conversion kit for converting a manually operated roll-up tarp assembly to a motor driven roll-up tarp assembly that can also be operated with a hand crank arm; the manually operated roll-up tarp assembly including a flexible tarp, a roll tube, upon which the flexible tarp can be gathered and from which the flexible tarp can be unfurled when the flexible tarp is gathered upon the roll tube, and a rear arm assembly; the roll tube having a first length and first and second ends; the conversion kit comprising:
- a first arm assembly including a motor having an output shaft, wherein the output shaft has an outer surface and the outer surface includes a first groove;
- a first pin; and
- a roll tube extension; the roll tube extension having first and second end segments; the first end segment being shaped so that it can slide onto the output shaft so as to become interconnected with the output shaft; wherein the roll tube can be modified by removing a portion of the roll tube proximate the second end to form a modified roll tube that has a second length; wherein the second length is shorter than the first length; and wherein the second end segment of the roll tube extension is connectable with the modified roll tube so as to form an extended modified roll tube and become an extension of the modified roll tube; wherein the roll tube extension further includes an inner surface that defines a generally hollow interior proximate the first end segment and the roll tube extension further includes a second groove that extends into the inner surface proximate the first end segment such that the first pin can reside at least partially in the first and second grooves at the same time when the respective first and second grooves are aligned such that the roll tube extension is engaged with the output shaft when the first pin resides at least partially in the first and second grooves;
- wherein the output shaft further includes a second pin aperture; and wherein the roll tube extension further includes a set of two second apertures that can be aligned with the output shaft in such a manner that the set of two second apertures can at least partially receive a second pin and the second pin can pass through the second pin aperture and both of the set of two second apertures to secure the roll tube extension to the output shaft so that the roll tube extension will turn with the output shaft when the second pin is secured in the set of two of second apertures and the second pin aperture; but removing the second pin will permit the hand crank arm to turn the extended modified roll tube so as to roll and unroll the flexible tarp on the extended modified roll tube.

11. The conversion kit of claim 10, wherein the second pin is a clevis pin.

12. The conversion kit of claim 10, wherein the first end segment includes a first pin aperture that can be aligned with the first and second grooves; wherein the first pin aperture and the first pin are sized in a manner that permits the first pin to be force fit into the first pin aperture in manner that prevents the first pin from becoming disengaged therefrom without applying force to the first pin to remove the first pin from the first pin aperture; wherein the roll tube extension and the first pin can rotate around the output shaft independently thereof when the first pin resides at least partially in the first groove and the first pin aperture.

13. The conversion kit of claim 12, wherein the roll tube extension further includes a lubrication access port in communication with the hollow interior proximate the first end segment to permit the introduction of lubricants into the hollow interior.

14. The conversion kit of claim 13, wherein the lubricant access port is fitted with a zerk fitting.

15. The conversion kit of claim 10, wherein the first arm assembly includes an upper portion and a lower portion and the upper portion has a generally hollow interior, wherein the upper portion is telescopically connected to the lower portion.

16. The conversion kit of claim 10, wherein the first pin is a roll pin.

17. A method of converting a manually operated roll-up tarp assembly having a rear arm assembly including a hand crank arm, to a motor driven roll-up tarp assembly, the manually operated roll-up tarp assembly including a flexible tarp and a roll tube upon which the flexible tarp can be gathered and from which the flexible tarp can be unfurled when the flexible tarp is gathered upon the roll tube; the roll tube having a first length and first and second ends; the first end including a splined connecting member; wherein the manually operated roll-up tarp assembly is installed on a truck box; the method comprising the steps of:

1) providing a roll-up tarp conversion kit including: a first arm assembly including a motor having an output shaft, wherein the output shaft has an outer surface and the outer surface includes a groove; a first pin; and a roll tube extension having first and second end segments and an inner surface that defines a hollow interior proximate the first end segment; the first end segment being constructed and shaped so that the first end segment can slide onto the output shaft to become connected therewith; wherein the roll tube extension further includes a first pin aperture that can be aligned with the groove when the roll tube extension is connected with the output shaft such that the first pin can be inserted into the first pin aperture and the groove such that the roll tube extension is engaged with the output shaft and cannot be disengaged therefrom, but wherein the roll tube extension and the first pin can rotate around the output shaft independently thereof when the first pin resides at least partially within the groove;

2) making a predetermined measurement to determine a position along a greatest length of the roll tube in which to cut the roll tube to remove a portion of the roll tube proximate the second end so that a modified roll tube can be created by removing the selected portion of the roll tube so that the modified roll tube has a second length that is shorter than the first length;

3) cutting the roll tube at the determined position so as to remove the selected portion of the roll tube proximate the second end and create a modified roll tube that has the second length; and, in no particular order;

4) securing the second end segment of the roll tube extension to the modified roll tube to form an extended modified roll tube;

5) securing the first arm assembly to the truck box;

6) securing the first end segment of the roll tube extension to the output shaft; and 7) inserting the first pin into the first pin aperture so that the first pin resides at least partially within the first groove so that the first pin can prevent the roll tube extension from disengaging from the output shaft, but such that the roll tube extension can rotate about the output shaft.

18. The method of claim 17, wherein the conversion kit further includes a second pin, the output shaft further includes a second pin aperture and the roll tube extension further includes a set of two second apertures that can be aligned with the output shaft in such a manner that the set of two second apertures can receive the second pin and the second pin can pass through both of the two second apertures and the second pin aperture to secure the roll tube extension to the output shaft so that the extension tube will turn with the output shaft when the second pin is secured in the set of two of second apertures and the second pin aperture; and wherein said method further comprises the step of:

inserting the second pin into the set of two second apertures and the second pin aperture to further secure the roll tube extension to the output shaft so that the extended modified roll tube will turn with the output shaft; wherein the extended modified roll tube can be turned with the hand crank arm independent of the output shaft if the second pin is removed from the second pin aperture and the set of two second apertures.

19. The method of claim 18, wherein the method further comprises the step of removing the second pin from the set of two second apertures and the second pin aperture to permit the extended modified roll tube to freely rotate about the output shaft independently of the output shaft so that the hand crank arm can be connected to the splined connecting member of the first end so that the hand crank arm can be used to manually turn the extended modified roll tube to either gather or unfurl the flexible tarp without turning the output shaft.

20. The method of claim 17, wherein the conversion kit further includes a second arm assembly and said method further comprises, in no particular order, the steps of securing the second arm assembly to the truck box and securing the second arm assembly to the first end of the roll tube.

* * * * *